(12) United States Patent
Xu et al.

(10) Patent No.: US 11,792,736 B2
(45) Date of Patent: Oct. 17, 2023

(54) POWER CONTROL FOR UPLINK COMMUNICATIONS IN FULL DUPLEX MODE

(71) Applicant: QUALCOMM Incorporated, San Diego, CA (US)

(72) Inventors: Huilin Xu, Temecula, CA (US); Muhammad Sayed Khairy Abdelghaffar, San Jose, CA (US); Ahmed Attia Abotabl, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/302,164

(22) Filed: Apr. 26, 2021

(65) Prior Publication Data

US 2021/0410075 A1    Dec. 30, 2021

Related U.S. Application Data

(60) Provisional application No. 63/043,548, filed on Jun. 24, 2020.

(51) Int. Cl.
*H04L 5/14*          (2006.01)
*H04W 52/14*       (2009.01)

(52) U.S. Cl.
CPC .............. *H04W 52/146* (2013.01); *H04L 5/14* (2013.01)

(58) Field of Classification Search
CPC ........... H04L 12/28; H04L 12/50; H04L 5/14; H04W 52/146
(Continued)

(56) References Cited

U.S. PATENT DOCUMENTS

2017/0302337 A1    10/2017    Liu et al.
2017/0325174 A1*   11/2017    Dinan ................. H04W 52/146
(Continued)

FOREIGN PATENT DOCUMENTS

EP          3739970 A1    11/2020
WO     2019170106 A1      9/2019

OTHER PUBLICATIONS

International Search Report and Written Opinion—PCT/US2021/070457—ISA/EPO—dated Jul. 15, 2021.
(Continued)

*Primary Examiner* — Dang T Ton
(74) *Attorney, Agent, or Firm* — Harrity & Harrity, LLP

(57) ABSTRACT

Various aspects of the present disclosure generally relate to wireless communication. In some aspects, a user equipment (UE) may determine a first power control parameter associated with a first uplink transmission from the UE, wherein the first power control parameter is based on at least one of: an adjusted target power for the first uplink transmission, an adjusted scaling factor for the first uplink transmission, a first parameter based at least in part on a self-interference associated with the UE, a second parameter based at least in part on a code rate or a modulation and coding scheme associated with a downlink transmission for the UE, or a combination thereof; and transmit, to a base station, the first uplink transmission based at least in part on the first power control parameter. Numerous other aspects are provided.

30 Claims, 11 Drawing Sheets

(58) Field of Classification Search
USPC .......................................................... 370/329
See application file for complete search history.

(56) References Cited

U.S. PATENT DOCUMENTS

2018/0279376 A1* 9/2018 Dinan ............... H04W 74/0833
2019/0253976 A1   8/2019 Pelletier et al.

OTHER PUBLICATIONS

3GPP Technical Specification 38.213, "3rd Generation Partnership Project, Technical Specification Group Radio Access Network, NR, Physical Layer Procedures for Control," version 15.3.0, Release 15, Sep. 2018, pp. 1-101.

* cited by examiner

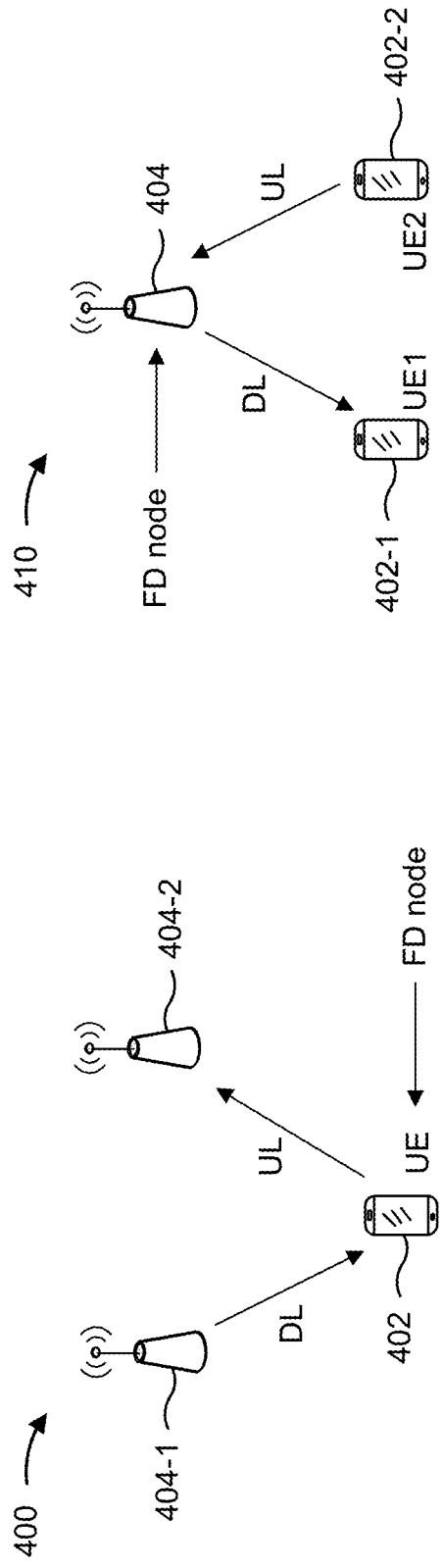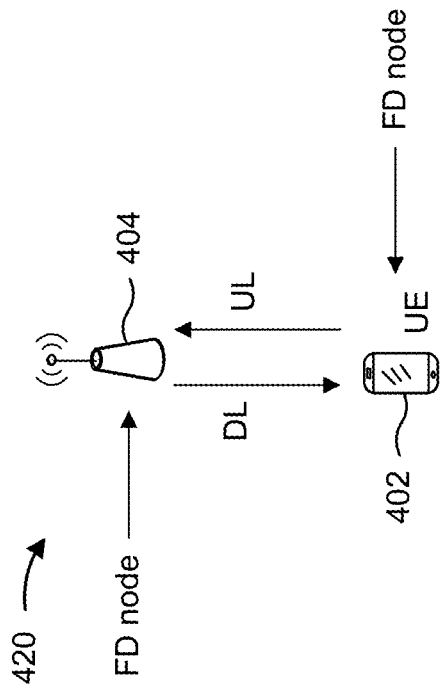
FIG. 4A
FIG. 4B
FIG. 4C

POWER CONTROL FOR UPLINK COMMUNICATIONS IN FULL DUPLEX MODE

CROSS-REFERENCE TO RELATED APPLICATION

This patent application claims priority to U.S. Provisional Patent Application No. 63/043,548, filed on Jun. 24, 2020, entitled "POWER CONTROL FOR UPLINK COMMUNICATIONS IN FULL DUPLEX MODE," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for controlling power for uplink communications in a full duplex mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a first power control parameter associated with a first uplink transmission from the UE, wherein the first power control parameter is based on at least one of an adjusted target power for the first uplink transmission, an adjusted scaling factor for the first uplink transmission, a first parameter based at least in part on a self-interference associated with the UE, a second parameter based at least in part on a code rate or a modulation and coding scheme (MCS) associated with a downlink transmission for the UE, or a combination thereof; and transmitting, to a base station, the first uplink transmission based at least in part on the first power control parameter.

In some aspects, a method of wireless communication performed by a base station includes transmitting, to a UE, a message that triggers the UE to adjust a first power control associated with a first uplink transmission from the UE, wherein adjusting the first power control includes at least one of adjusting a target power, adjusting a scaling factor, adjusting the first power control based at least in part on a self-interference associated with the UE, adjusting the first power control based at least in part on a code rate or an MCS associated with a downlink transmission for the UE, or a combination thereof; and receiving, from the UE, the first uplink transmission based at least in part on transmitting the message.

In some aspects, a non-transitory computer-readable medium storing a set of instructions for wireless communication includes one or more instructions that, when executed by one or more processors of a UE, cause the UE to determine a first power control parameter associated with a first uplink transmission from the UE, wherein the first power control parameter is based on at least one of an adjusted target power for the first uplink transmission, an adjusted scaling factor for the first uplink transmission, a first parameter based at least in part on a self-interference associated with the UE, a second parameter based at least in part on a code rate or an MCS associated with a downlink transmission for the UE, or a combination thereof; and transmit, to a base station, the first uplink transmission based at least in part on the first power control parameter.

In some aspects, a non-transitory computer-readable medium storing a set of instructions for wireless communication includes one or more instructions that, when executed by one or more processors of a base station, cause the base station to transmit, to a UE, a message that triggers the UE to adjust a first power control associated with a first uplink transmission from the UE, wherein adjusting the first power control includes at least one of adjusting a target power, adjusting a scaling factor, adjusting the first power control based at least in part on a self-interference associated with the UE, adjusting the first power control based at least in part on a code rate or an MCS associated with a downlink transmission for the UE, or a combination thereof; and receive, from the UE, the first uplink transmission based at least in part on transmitting the message.

In some aspects, a UE for wireless communication includes a memory and one or more processors coupled to the memory, the memory and the one or more processors configured to determine a first power control parameter associated with a first uplink transmission from the UE, wherein the first power control parameter is based on at least one of an adjusted target power for the first uplink transmission, an adjusted scaling factor for the first uplink transmission, a first parameter based at least in part on a self-interference associated with the UE, a second parameter based at least in part on a code rate or an MCS associated with a downlink transmission for the UE, or a combination thereof; and transmit, to a base station, the first uplink transmission based at least in part on the first power control parameter.

In some aspects, a base station for wireless communication includes a memory and one or more processors coupled to the memory, the memory and the one or more processors configured to transmit, to a UE, a message that triggers the UE to adjust a first power control associated with a first uplink transmission from the UE, wherein adjusting the first power control includes at least one of adjusting a target power, adjusting a scaling factor, adjusting the first power control based at least in part on a self-interference associated with the UE, adjusting the first power control based at least in part on a code rate or an MCS associated with a downlink transmission for the UE, or a combination thereof; and receive, from the UE, the first uplink transmission based at least in part on transmitting the message.

In some aspects, an apparatus for wireless communication includes means for determining a first power control parameter associated with a first uplink transmission from the apparatus, wherein the first power control parameter is based on at least one of an adjusted target power for the first uplink transmission, an adjusted scaling factor for the first uplink transmission, a first parameter based at least in part on a self-interference associated with the apparatus, a second parameter based at least in part on a code rate or an MCS associated with a downlink transmission for the apparatus, or a combination thereof; and means for transmitting, to a base station, the first uplink transmission based at least in part on the first power control parameter.

In some aspects, an apparatus for wireless communication includes means for transmitting, to a UE, a message that triggers the UE to adjust a first power control associated with a first uplink transmission from the UE, wherein adjusting the first power control includes at least one of adjusting a target power, adjusting a scaling factor, adjusting the first power control based at least in part on a self-interference associated with the UE, adjusting the first power control based at least in part on a code rate or an MCS associated with a downlink transmission for the UE, or a combination thereof; and means for receiving, from the UE, the first uplink transmission based at least in part on transmitting the message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A, 4B, 4C, and 4D are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
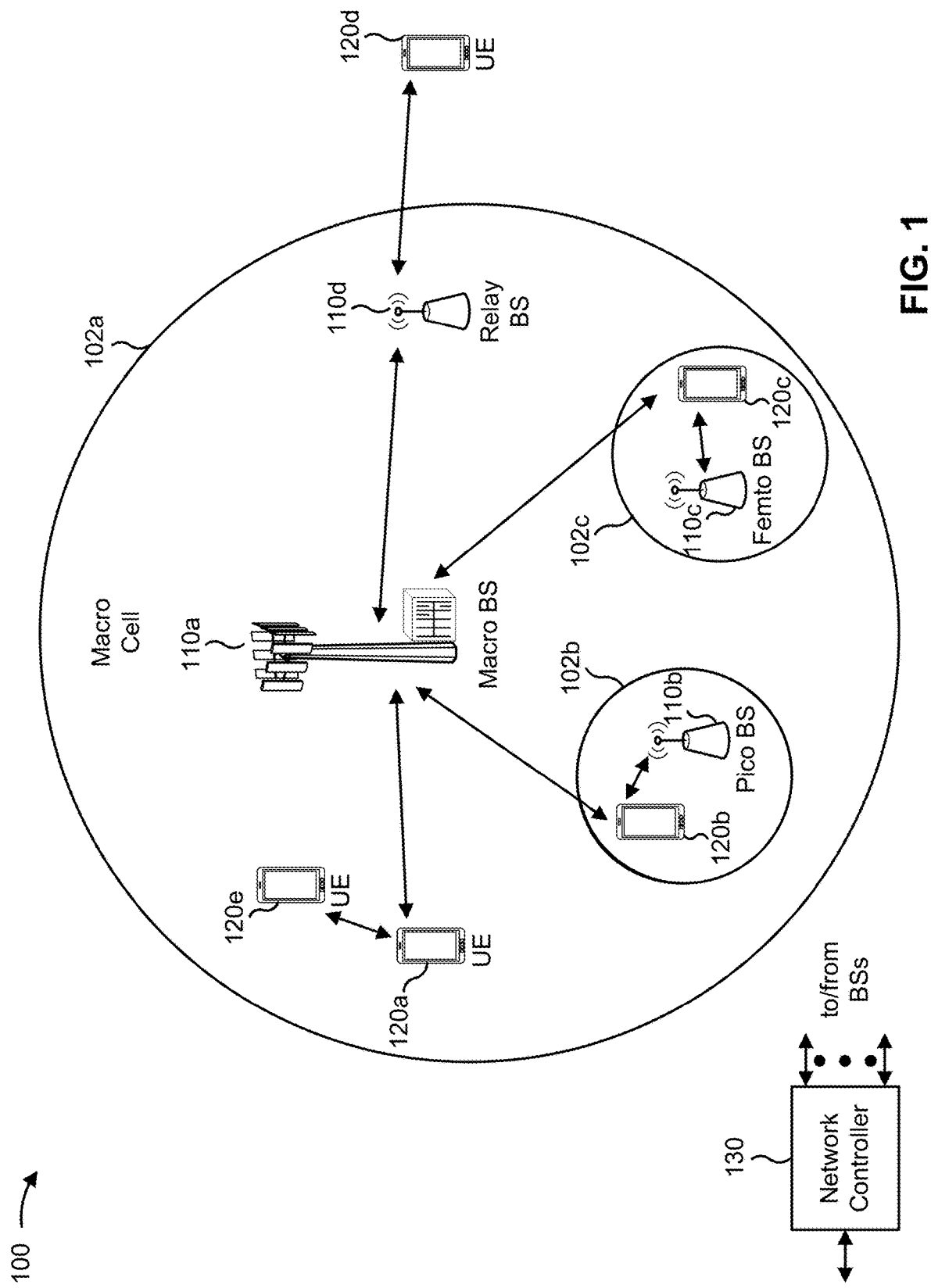
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
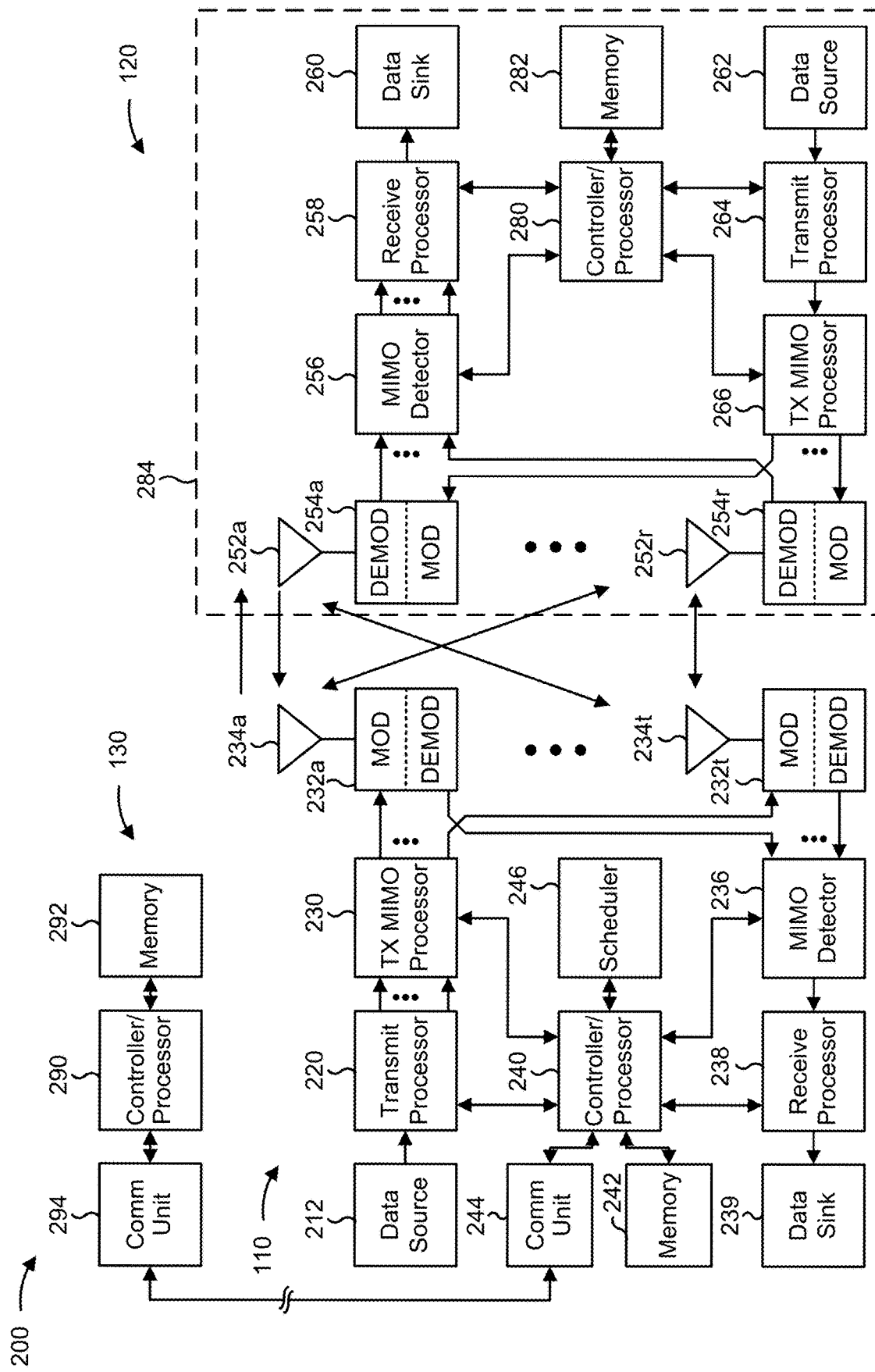
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5A-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5A-8).

Controller/processor 240 of base station 110, controller/processor 280 of UE 120, and/or any other component(s) of FIG. 2 may perform one or more techniques associated with controlling power for uplink communications in a full duplex mode, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., the UE 120) may include means for determining a first power control parameter associated with a first uplink transmission from the UE, wherein the first power control parameter is based on at least one of an adjusted target power for the first uplink transmission, an adjusted scaling factor for the first uplink transmission, a first parameter based at least in part on a self-interference associated with the UE, a second parameter based at least in part on a code rate or an MCS associated with a downlink transmission for the UE, or a combination thereof; and/or means for transmitting, to a base station (e.g., the base station 110), the first uplink transmission based at least in part on the first power control parameter. The means for the UE to perform operations described herein may include, for example, one or more of controller/processor 280, transmit processor 264, TX MIMO processor 266, MOD 254, antenna 252, DEMOD 254, MIMO detector 256, receive processor 258, or memory 282.

In some aspects, a base station (e.g., the base station 110) may include means for transmitting, to a UE (e.g., the UE 120), a message that configures the UE to adjust a first power control associated with a first uplink transmission from the UE, wherein adjusting the first power control includes at least one of adjusting a target power, adjusting a scaling factor, adjusting the first power control based at least in part on a self-interference associated with the UE, adjusting the first power control based at least in part on a code rate or an MCS associated with a downlink transmission for the UE, or a combination thereof; and/or means for receiving, from the UE, the first uplink transmission based at least in part on transmitting the message. The means for the base station to perform operations described herein may include, for example, one or more of antenna 234, DEMOD 232, MIMO detector 236, receive processor 238, controller/processor 240, transmit processor 220, TX MIMO processor 230, MOD 232, antenna 234, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
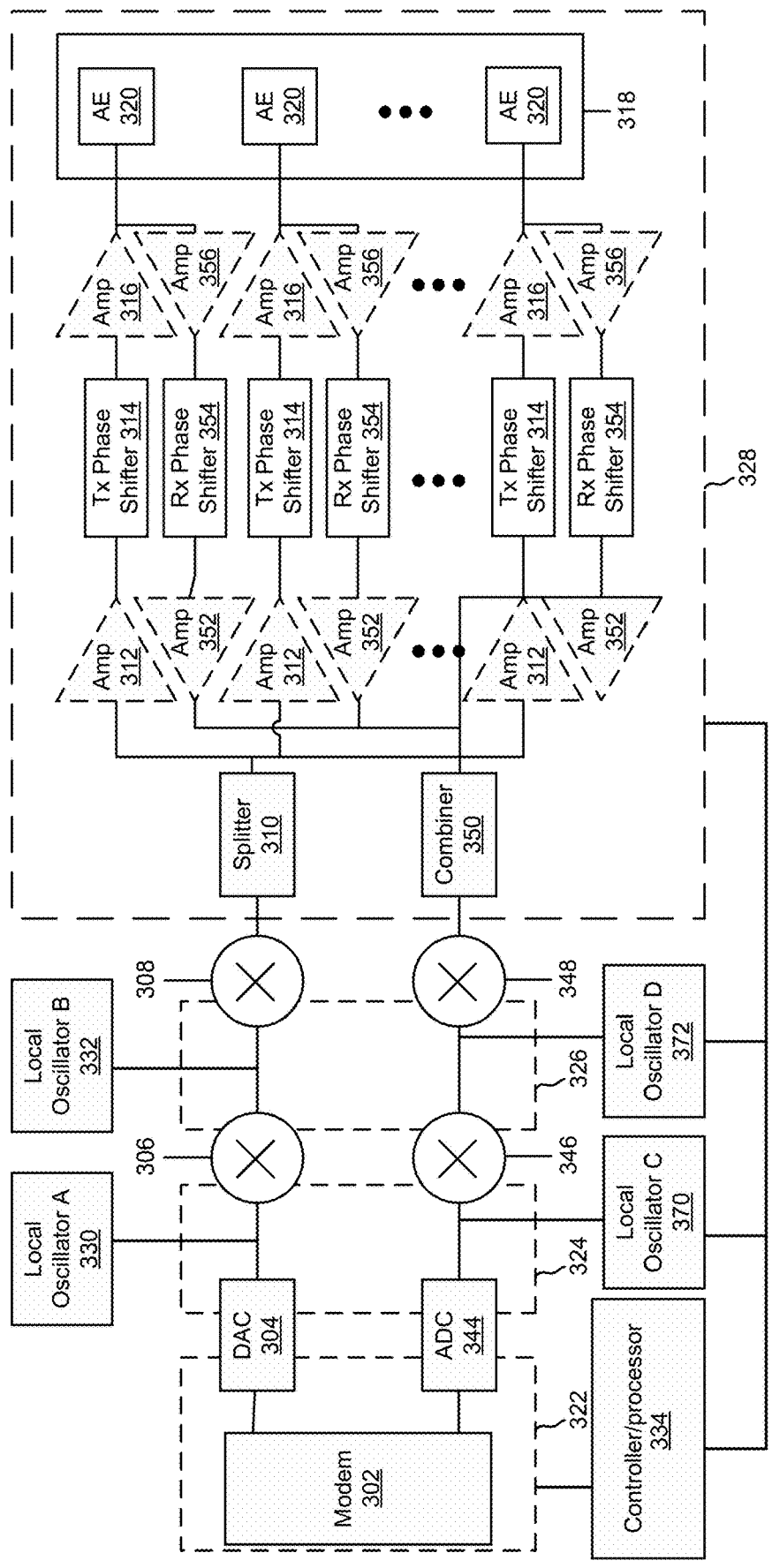
FIG. 3 is a diagram illustrating an example of beamforming architecture that supports beamforming for millimeter wave (mmW) communications, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316, respectively, are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first amplifier 312 and/or second amplifier 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

FIGS. 4A, 4B, and 4C are diagrams illustrating examples 400, 410, and 420, respectively, of full duplex communication. As shown in FIGS. 4A-4C, examples 400, 410, and 420 each include one or more UEs 402 in communication with one or more base stations (or TRPs) 404 in a wireless network that supports full duplex communication. However, it will be appreciated that the devices shown in FIGS. 4A-4C are provided by way of example only, and that the wireless network may support full duplex communication between other devices (e.g., between a mobile termination (MT) node and a control node (for example, a central unit (CU) or a distributed unit (DU)), between a child node and a parent node in an integrated access backhaul (IAB) network, and/or between a scheduled node and a scheduling node).

As shown in FIG. 4A, example 400 includes a UE 402 in communication with two base stations (or TRPs) 404-1 and 404-2. As shown in FIG. 4A, the UE 402 may transmit one or more uplink transmissions to base station 404-1 and may concurrently receive one or more downlink transmissions from base station 404-2. Accordingly, in the example 400 shown in FIG. 4A, full duplex communication is enabled for the UE 402, which may be operating as a full duplex node, but not for the base stations 404-1 and 404-2, which may be operating as half duplex nodes. Additionally, or alternatively, as shown in FIG. 4B, example 410 includes two UEs, UE1 402-1 and UE2 402-2, in communication with a base station (or TRP) 404. In this case, the base station 404 may transmit one or more downlink transmissions to the UE1 402-1 and may concurrently receive one or more uplink transmissions from the UE2 402-2. Accordingly, in the example 410 shown in FIG. 4B, full duplex communication is enabled for the base station 404, which may be operating as a full duplex node, but not for the UE1 402-1 and UE2 402-2, which may be operating as half duplex nodes. Additionally, or alternatively, as shown in FIG. 4C, example 420 includes a UE 402 in communication with a base station (or TRP) 404. In this case, the base station 404 may transmit, and the UE 402 may receive, one or more downlink transmissions concurrently with the UE 402 transmitting, and the base station 404 receiving, one or more uplink transmissions. Accordingly, in the example 420 shown in FIG. 4C, full duplex communication is enabled for both the UE 402 and the base station 404, each of which is operating as a full duplex node.

Utilizing full duplex communication provides reduced latency by allowing a full duplex node to transmit or receive a downlink signal in an uplink-only slot and/or to transmit or receive an uplink signal in a downlink-only slot. In addition, full duplex communication enhances spectral efficiency and/or network throughput (e.g., on a per cell and/or per UE basis), which results in more efficient resource utilization, by simultaneously utilizing time and frequency resources for uplink and downlink communication.

As indicated above, FIGS. 4A-4C are provided as examples. Other examples may differ from what is described with regard to FIGS. 4A-4C.

Figure 4D:
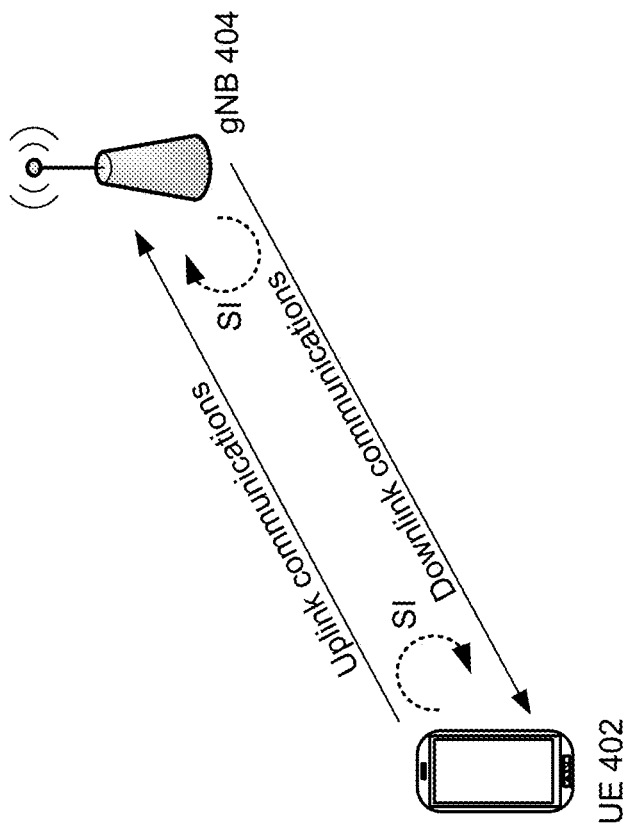

FIG. 4D is a diagram illustrating another example 430 of full duplex communication. As shown in FIG. 4D, example 430 includes a UE 402 in communication with a base station (e.g., gNB 404), or another type of TRP, in a wireless network that supports full duplex communication (e.g., wireless network 100 of FIG. 1). However, it will be appreciated that the devices shown in FIG. 4D are provided by way of example only, and that the wireless network may support full duplex communication between other devices (e.g., between an MT node and a control node, between a child node and a parent node in an IAB network, and/or between a scheduled node and a scheduling node).

As shown in FIG. 4D, the UE 402 may experience self-interference (SI) between uplink communications to the gNB 404 and downlink communications from the gNB 404. Similarly, the gNB 404 may experience SI between uplink communications from the UE 402 and downlink communications to the UE 402. In some aspects, the SI may be caused by overlaps in time and/or frequency between the uplink communications and downlink communications (e.g., as described below in connection with FIG. 5A). Additionally, or alternatively, the SI may be caused by little to no guard time and/or frequency between the uplink communications and downlink communications (e.g., as described below in connection with FIGS. 5B-5C).

Accordingly, full duplex communication may be performed by selecting suitable uplink and downlink beam pairs (e.g., transmit and receive beams that are associated with different antenna panels of a UE and/or associated with different antenna panels and/or TRPs of a base station) to reduce or minimize self-interference (especially clutter echo) via spatial isolation. Accordingly, the UE 402 and/or the base station 404 may determine uplink and downlink beams, that are separated on respective antenna panels (and/or TRPs), to provide reliable full duplex communication by selecting beam pairs that minimize, or at least reduce, self-interference at the UE 402 and/or the base station 404, respectively.

Measuring self-interference at a wireless node with full duplex capabilities may assist in determining uplink and downlink beam pairs that support full duplex communication. For example, the UE 402 (or an IAB child node, an MT unit, and/or another similar node) may obtain self-interference measurements to determine one or more candidate uplink transmit beams that can be paired with one or more candidate downlink receive beams. Additionally, or alternatively, the gNB 404 (or an IAB parent node, a CU, a DU, and/or another similar node) may obtain self-interference measurements to determine one or more candidate uplink receive beams that can be paired with one or more candidate downlink transmit beams. In general, to obtain the self-interference measurements, a wireless node with full duplex capabilities may transmit a signal from a first set of antennas (and/or TRPs) in one or more transmit beam directions, and the wireless node may concurrently measure a received signal (e.g., a reflected or leaked transmit signal) on a second set of antennas (and/or TRPs) in one or more receive beam directions, where the first set of antennas may be different from or the same as the second set of antennas.

Some aspects described herein relate to techniques and apparatuses that enable further reductions in self-interference between uplink communications from and downlink communications to the UE 402. In some aspects, techniques and apparatuses described herein may enable the UE 402 to adjust a transmit power used by the UE 402 for uplink communications in order to further reduce self-interference with downlink communications. Accordingly, the UE 402 improves the reliability and/or quality of full duplex communications. In addition, the UE 402 conserves network overhead and processing resources by reducing a quantity of retransmissions of the downlink communications that may be required due to self-interference.

As indicated above, FIG. 4D is provided as an example. Other examples may differ from what is described with regard to FIG. 4D.

Figure 5A:
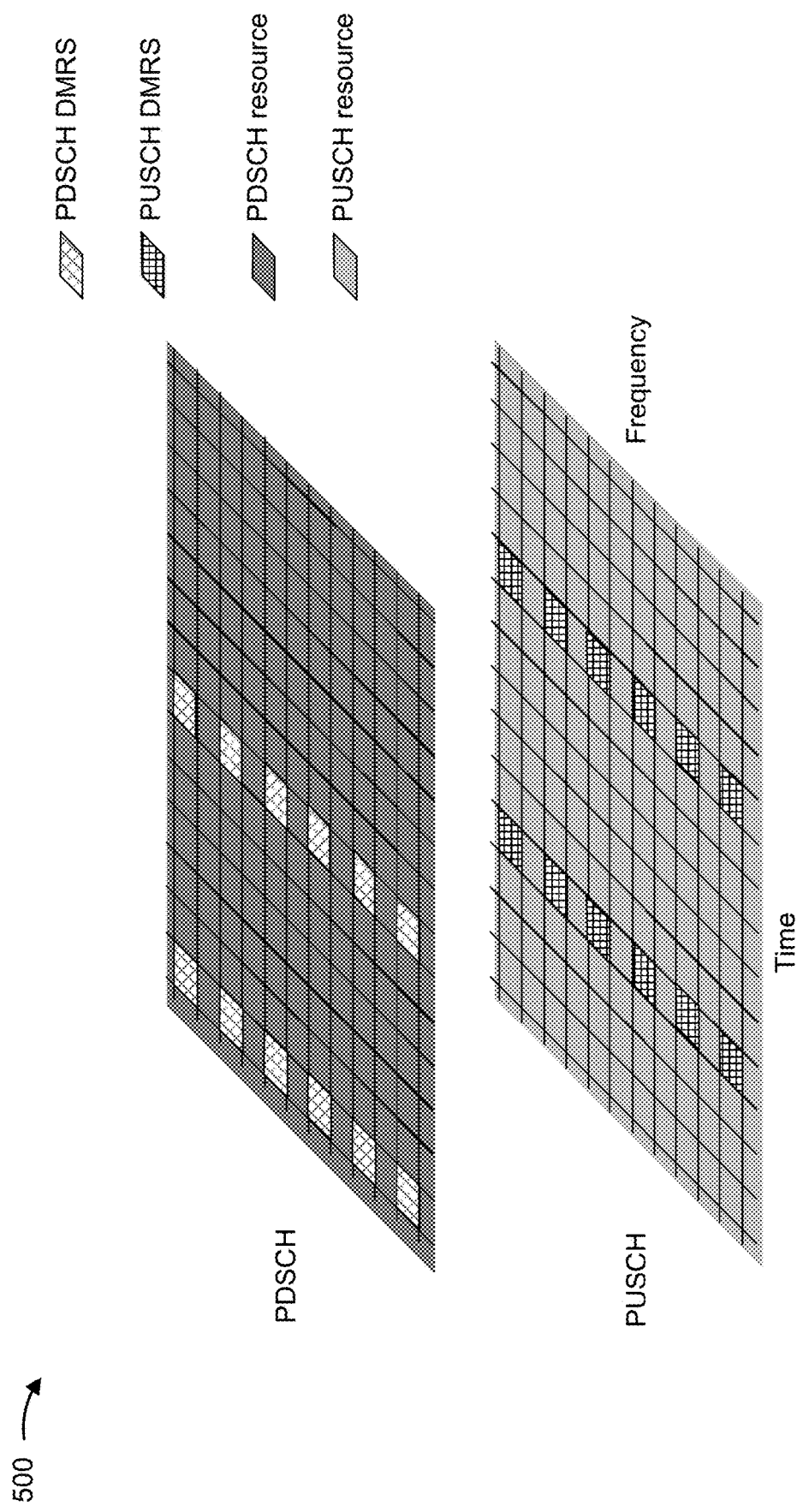
FIGS. 5A, 5B, and 5C are diagrams illustrating examples of overlapping or neighboring symbols in full duplex communication, in accordance with the present disclosure.
Figure 5B:
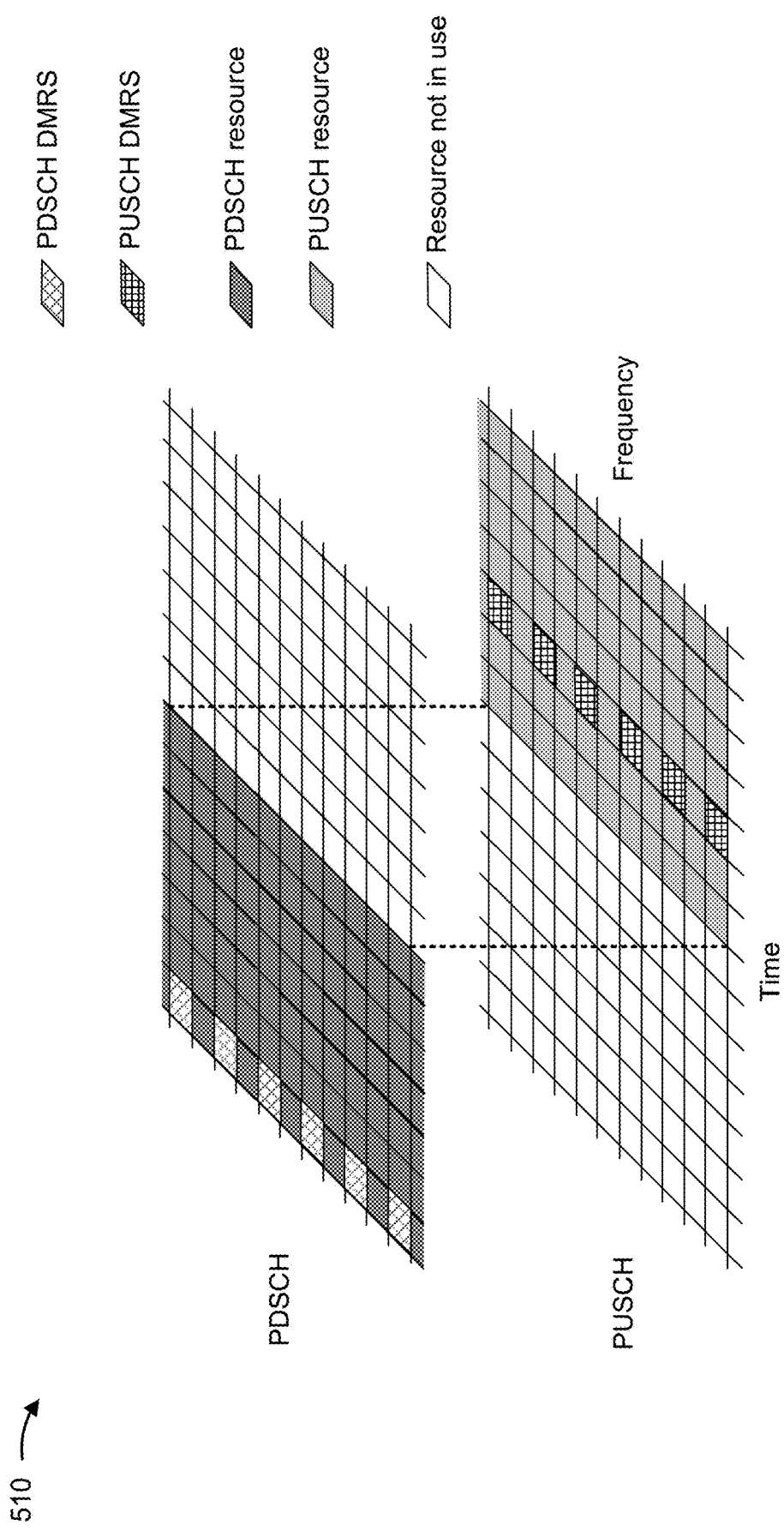
Figure 5C:
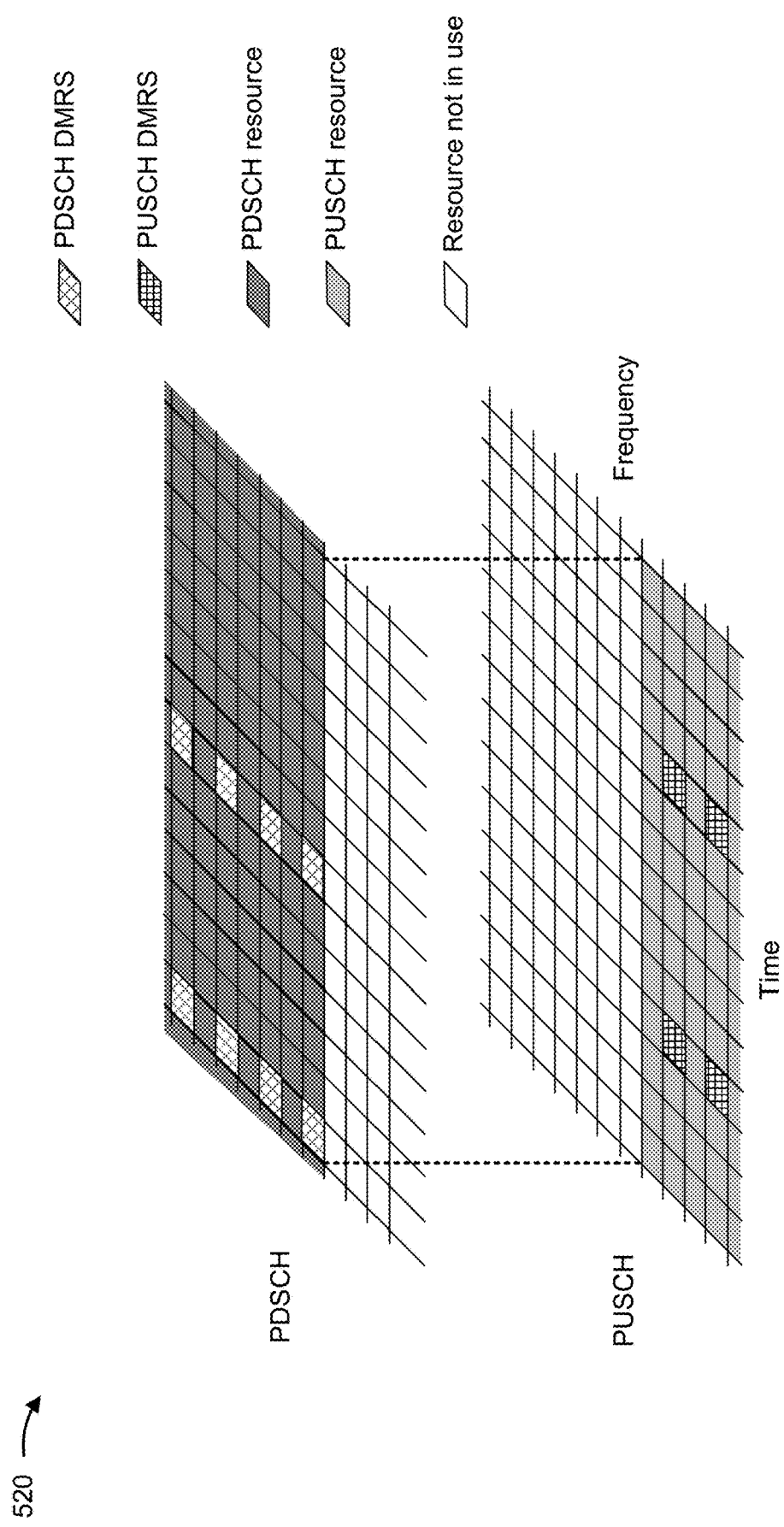

FIGS. 5A, 5B, and 5C are diagrams illustrating examples 500, 510, and 520, respectively, of overlapping or neighboring symbols in full duplex communication. Examples 500, 510, and 520 each include symbols depicted as areas within a time dimension and a frequency dimension. In FIGS. 5A-5C, uplink communications and downlink communications use the shaded symbols for respective uplink and downlink channels. Examples 500, 510, and 520 each show uplink symbols, including DMRS, for a physical uplink shared channel (PUSCH), and downlink symbols, including DMRS, for a physical downlink shared channel (PDSCH). Although the description below will focus on a PUSCH and a PDSCH, the description similarly applies to other channels for uplink communications and/or other channels for downlink communications, respectively.

Examples 500, 510, and 520 each may be associated with a full duplex mode of a UE (e.g., UE 402, UE 120, and/or another network node, such as an MT unit and/or a child IAB node) and/or a base station (e.g., gNB 404, base station 110, and/or another network node, such as a CU, a DU, and/or a parent IAB node). As shown in FIG. 5A, example 500 includes at least some downlink symbols and at least some uplink symbols that overlap in time and frequency. Accordingly, in example 500, the UE 402 may transmit and receive, in a same frequency bandwidth, concurrently. For example, the UE 402 may transmit to the gNB 404, and receive from the gNB 404, concurrently in one or more overlapping frequencies.

As shown in FIG. 5B, example 510 includes at least some uplink symbols that neighbor at least some downlink symbols in time. Although FIG. 5B shows no guard time between the neighboring symbols, the description similarly applies to a configuration in which at least some uplink symbols are separated from at least some downlink symbols in time by less than a threshold amount of time. Accordingly, in example 510, the UE 402 may transmit a first set of symbols and receive a second set of symbols, in a same frequency bandwidth, where the first set of symbols and the second set of symbols are separated in time with no guard time or with a guard time less than the threshold amount of time. For example, the UE 402 may transmit to the gNB 404 during a first time period, and receive from the gNB 404 during a second time period, in one or more overlapping frequencies.

As shown in FIG. 5C, example 520 includes at least some uplink symbols that neighbor at least some downlink symbols in frequency. Although FIG. 5C shows no guard band between the neighboring symbols, the description similarly applies to a configuration in which at least some uplink symbols are separated from at least some downlink symbols in frequency by less than a threshold amount of frequency. Accordingly, in example 520, the UE 402 may transmit a first set of symbols in a first frequency bandwidth and, concurrently, receive a second set of symbols in a second frequency bandwidth, where the first frequency bandwidth and the second frequency bandwidth are separated in frequency with no guard band or with a guard band less than the threshold amount of frequency. For example, the UE 402 may, concurrently, transmit to the gNB 404 in a first set of frequencies and receive from the gNB 404 in a second set of frequencies.

As indicated above, FIGS. 5A-5C are provided as examples. Other examples may differ from what is described with regard to FIGS. 5A-5C.

Figure 6:
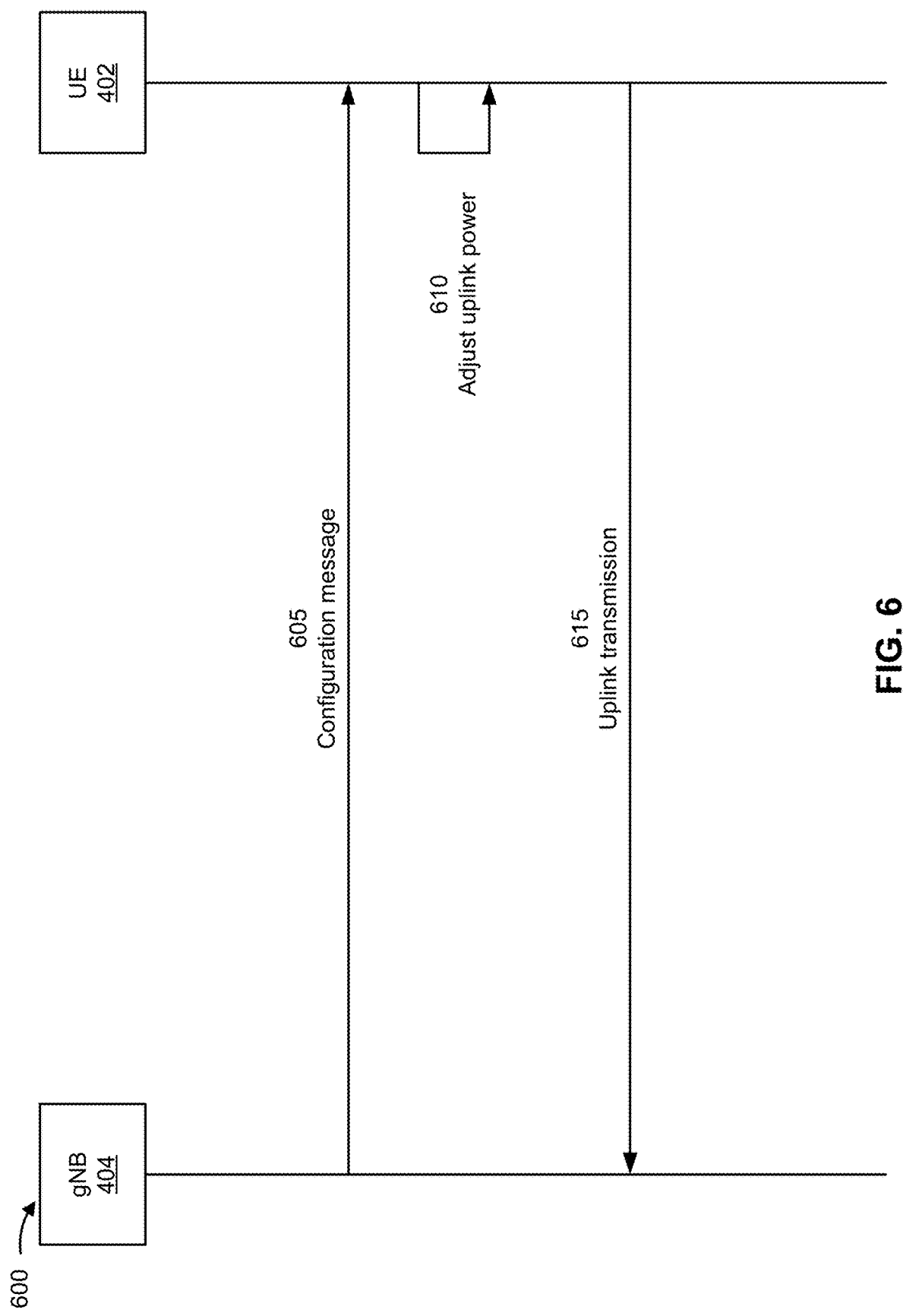
FIG. 6 is a diagram illustrating an example of controlling power for uplink communications in a full duplex mode, in accordance with the present disclosure.

FIG. 6 is a diagram illustrating an example 600 of controlling power for uplink communications in a full duplex mode, in accordance with the present disclosure. As shown in FIG. 6, example 600 includes a UE 402 communicating with a gNB 404. Although described below using the gNB 404, the description similarly applies to other network nodes (e.g., a base station 110, a TRP, an IAB child node, and/or an IAB parent node) in communication with the UE 402. The gNB 404 may communicate with the UE 402 on a wireless network (e.g., wireless network 100 of FIG. 1).

In example 600, the UE 402 and/or the gNB 404 may operate in a full duplex mode (e.g., as described above in connection with FIGS. 4A-4D). In some aspects, and as described above in connection with FIG. 5A, the UE 402, when in the full duplex mode, may transmit and receive, in a same frequency bandwidth, concurrently. Additionally, or alternatively, and as described above in connection with FIG. 5B, the UE 402, when in the full duplex mode, may transmit a first set of symbols and receive a second set of symbols, in a same frequency bandwidth, where the first set of symbols and the second set of symbols are separated in time by less than a threshold amount of time. Additionally, or alternatively, and as described above in connection with FIG. 5C, the UE 402, when in the full duplex mode, may transmit a first set of symbols in a first frequency bandwidth and, concurrently, receive a second set of symbols in a second frequency bandwidth, where the first frequency bandwidth and the second frequency bandwidth are separated in frequency by less than a threshold amount of frequency.

As shown in connection with reference number 605, the gNB 404 may transmit, and the UE 402 may receive, a message that triggers the UE 402 to adjust a first power control associated with a first uplink transmission from the UE 402. As used herein, the message may "trigger" by causing the UE 402 to perform an action (e.g., adjusting the first power control) in response to receiving the message and/or in response to information included in, and/or indicated by, the message. Additionally, or alternatively, the message may "trigger" by providing the UE 402 with one or more parameters and/or other information that the UE 402 uses to perform an action (e.g., adjusting the first power control).

In some aspects, the message may include a medium access control (MAC) control element (MAC-CE) and/or another control element. Additionally, or alternatively, the message may include downlink control information (DCI) and/or another signal including information associated with the first uplink information. Accordingly, the UE 402 may determine a first power control parameter and adjust the first power control in accordance with or otherwise based at least in part on the first power control parameter.

In some aspects, the first uplink transmission may be associated with a first channel that includes at least one of a PUSCH, a PUCCH, a sounding reference signal (SRS), a random access channel (RACH), or a combination thereof. Accordingly, the UE 402 may determine the first power control parameter for the first channel. In some aspects, the UE 402 may determine the first power control parameter associated with the first uplink transmission independently of determining a second power control parameter associated with a second uplink transmission. For example, the second uplink transmission may be associated with a second channel that is different from the first channel and that may include at least one of a PUSCH, a PUCCH, an SRS, a RACH, or a combination thereof.

Additionally, or alternatively, the first uplink transmission may be associated with the full duplex mode of the UE 402, as described above. Accordingly, in some aspects, the UE 402 may determine the first power control parameter associated with the first uplink transmission independently of determining a second power control parameter associated with a second uplink transmission. For example, the second uplink transmission may be associated with a half duplex mode for the UE 402.

Additionally, or alternatively, the first uplink transmission may be associated with a first resource indicator. For example, the first uplink transmission may be associated with a first SRS resource. Accordingly, in some aspects, the UE 402 may determine the first power control parameter associated with the first uplink transmission independently of determining a second power control parameter associated with a second uplink transmission. For example, the second uplink transmission may be associated with a second resource indicator that is different from the first resource indicator. In some aspects, the second uplink transmission may be associated with a second SRS resource that is different from the first SRS resource.

Additionally, or alternatively, the first uplink transmission may be associated with an ultra-reliable low-latency communication (URLLC) mode of the UE 402. For example, the first uplink transmission may include a URLLC or may otherwise be transmitted on a URLLC resource. Accordingly, in some aspects, the UE 402 may determine the first power control parameter associated with the first uplink transmission independently of determining a second power control parameter associated with a second uplink transmission. For example, the second uplink transmission may be not associated with the URLLC mode.

Additionally, or alternatively, the first uplink transmission may include at least one first symbol associated with the full duplex mode for the UE 402, and at least one second symbol associated with the half duplex mode for the UE 402. For example, the first uplink transmission may include the at least one first symbol before or after the at least one second symbol. Additionally, or alternatively, the first uplink transmission may include the at least one first symbol in one or more first frequencies and the at least one second symbol in one or more second frequencies that are different from the one or more first frequencies. In some aspects, the at least one first symbol may overlap, in time and/or in frequency, with one or more symbols used for downlink communications from the gNB 404, and the at least one second symbol may not overlap with the one or more symbols used for downlink communications from the gNB 404.

Accordingly, the UE 402 may transmit the first uplink transmission using the first power control parameter for the at least one first symbol and using the first power control parameter for the at least one second symbol. For example, the UE 402 may use the same transmit power for the at least one first symbol as for the at least one second symbol.

As shown in connection with reference number 610, the UE 402 may adjust the first power control. For example, the UE 402 may adjust the first power control in accordance with or otherwise based at least in part on the first power control parameter.

As described above, the UE 402 may determine the first power control parameter based at least in part on receiving the message from the gNB 404. Additionally, or alternatively, the UE may determine the first power control parameter based at least in part on a setting stored in a memory of the UE 402. For example, the UE 402 may be programmed (and/or otherwise preconfigured) with one or more rules (e.g., according to 3GPP specifications and/or another standard). In some aspects, the UE 402 may determine the first power control based at least in part on a combination of the message with a stored setting. For example, the message may trigger the UE 402 to use the stored setting to determine the first power control. Additionally, or alternatively, the message may include one or more coefficients and/or other variables that the UE 402 uses, in combination with the stored setting, to determine the first power control parameter.

In some aspects, the first power control parameter may be based on at least one of an adjusted target power for the first uplink transmission, an adjusted pathloss scaling factor for the first uplink transmission, a first parameter based at least in part on a self-interference associated with the UE 402, a second parameter based at least in part on a code rate or an MCS associated with a downlink transmission for the UE 402, or a combination thereof. For example, the first power control parameter may be based on a smaller target power (e.g., represented by $P_{O_{PUSCH,b,f,c}}(j)$) for an uplink bandwidth part (e.g., represented by b) within a carrier (e.g., represented by f), and for an uplink configuration (e.g., represented by j) in a serving cell (e.g., represented by c) that includes the gNB 404. As used herein, "bandwidth part" or "BWP" may refer to a contiguous set of physical resource blocks (PRBs), where each PRB includes a set of frequencies corresponding to one or more subcarriers. A "subcarrier" may refer to a frequency based at least in part on a "carrier" frequency, and subcarriers may be aggregated to convey information wirelessly (e.g., using OFDM symbols and/or other RF symbols). As used herein, a "serving cell" may include a primary cell (PCell) with which the UE 402 is in a connected state (e.g., an RRC_CONNECTED state, as defined in 3GPP specifications and/or another standard). In some aspects, a "serving cell" may further include a secondary cell (SCell), such as a cell in a master cell group (MCG) other than the PCell, a primary secondary cell (PSCell), a primary secondary cell (PSCell), or another cell in a secondary cell group (SCG), when the UE 405 is configured for carrier aggregation with the secondary cell and the primary cell.

Additionally, or alternatively, the first power control parameter may be based on a smaller pathloss scaling factor (e.g., represented by $\alpha_{b,f,c}(j)$) for the uplink bandwidth part (e.g., represented by b) within the carrier (e.g., represented by f), and for the uplink configuration (e.g., represented by j) in the serving cell (e.g., represented by c) that includes the gNB 404. Additionally, or alternatively, the first power control parameter may include a parameter that reduces a transmit power for the first uplink transmission linearly, logarithmically, or otherwise based at least in part on the self-interference associated with the UE 402. For example, the parameter may become increasing negative as the self-interference increases. Additionally, or alternatively, the first power control parameter may include a parameter that reduces a transmit power based at least in part on a code rate and/or an MCS associated with a downlink transmission for the UE 402. For example, the parameter may become increasing negative as the code rate and/or the MCS for the downlink transmission increases.

Accordingly, in one example, when the first uplink transmission includes a PUSCH transmission, the UE 402 may determine the transmit power according to a form similar to the following:

$$P_{PUSCH,b,f,c}(i, j, q_d, q_u, l) = \min$$
$$\left\{ \begin{array}{l} P_{CMAX,f,c}(i), \\ P_{O\_PUSCH,b,f,c}(j) + \log_{10}(2^\mu \cdot M_{RB,b,f,c}^{PUSCH}(i)) + \alpha_{b,f,c}(j) \cdot PL_{b,f,c}(q_d) + \\ +\Delta_{TF,b,f,c}(i) + f_{b,f,c}(i, l) + \beta_{b,f,c}(q_d, q_u) + \Delta_{TF,d}(i) \end{array} \right\}.$$

In this example, b may represent a bandwidth part associated with an uplink connection, to the gNB 404, for the first uplink transmission; f may represent a carrier including the bandwidth part; c may represent a serving cell for the UE 402 and including the gNB 404; i may represent an occasion (e.g., in time) in which the UE 402 transmits the first uplink transmission; and l may represent an indicator of a configuration for the PUSCH.

Additionally, $P_{PUSCH,b,f,c}(i,j,q_d,q_u,l)$ may represent the transmit power for the first uplink transmission, and $P_{CMAX,f,c}(i)$ may represent a maximum output power configured for the UE 402 (e.g., configured via a radio resource configuration (RRC) message from the gNB 404 and/or preconfigured for the UE 402 according to 3GPP specifications and/or another standard). Additionally, $P_{O\_PUSCH,b,f,c}(j)$ may represent a target power associated with the first uplink transmission, where j may represent an indicator of a nominal power upon which the target power is based, at least in part. In some aspects, as described above, the first power control parameter may include a reduced target power that the UE 402 uses in lieu of $R_{O\_PUSCH,b,f,c}(j)$.

Additionally, $M_{RB,b,f,c}^{PUSCH}(i)$ may represent a bandwidth of a resource assignment associated with the first uplink transmission, and ti may represent a subcarrier spacing (SCS) configuration associated with the first uplink transmission. As used herein, "subcarrier spacing" or "SCS" may refer to a range of frequencies (or an amount of bandwidth) between two consecutive subcarriers used on a cell. Moreover, $\alpha_{b,f,c}(j)$ may represent a scaling factor for a pathloss estimate (which in turn may be represented by $PL_{b,f,c}(q_d)$), where $q_d$ may represent a reference signal used to estimate the pathloss. In some aspects, as described above, the first power control parameter may include a reduced scaling factor for the pathloss estimate that the UE 402 uses in lieu of $\alpha_{b,f,c}(j)$.

Additionally, $\Delta_{TF,b,f,c}(i)$ may represent a factor based at least in part on a code rate and/or an MCS associated with the first uplink transmission. For example, $\Delta_{TF,b,f,c}(i)$ may increase $P_{PUSCH,b,f,c}(i,j,q_d,q_u,l)$ as the code rate and/or the MCS increases. Similarly, in some aspects, the UE 402 may additionally use $\Delta_{TF,d}(i)$ to determine $P_{PUSCH,b,f,c}(i,j,q_d,q_u,l)$. Similar to $\Delta_{TF,b,f,c}(i)$, $\Delta_{TF,d}(t)$ may represent a factor based at least in part on a code rate and/or an MCS associated with a downlink transmission, where d may represent the downlink transmission that at least partially overlaps, in time and/or in frequency, or at least partially neighbors (e.g., within a threshold amount of time and/or a threshold amount of frequency), the first uplink transmission. Similar to $\Delta_{TF,b,f,c}(i)$, $\Delta_{TF,d}(i)$ may become increasingly negative (and thus reduce $P_{PUSCH,b,f,c}(i,j,q_d,q_u,l)$) as the code rate and/or the MCS of the downlink transmission increases.

Additionally, $f_{b,f,c}(i,l)$ may represent an adjustment state for the PUSCH configuration (e.g., represented by l). In some aspects, the UE 402 may additionally use $\beta_{b,f,c}(q_d,q_u)$ to determine $P_{PUSCH,b,f,c}(i,j,q_d,q_u,l)$. $\beta_{b,f,c}(q_d,q_u)$ may represent a factor based at least in part on a self-interference associated with the UE 402. For example, the self-interference may have been measured using a reference signal (e.g., represented by $q_d$) on a downlink connection with the gNB 404 and a reference signal (e.g., represented by $q_u$) on the uplink connection with the gNB 404. Although represented using $q_d$, the reference signal used on the downlink connection to measure the self-interference may include the same reference signal as used, or a different reference signal than used, to estimate the pathloss, as described above.

In another example, when the first uplink transmission includes a PUCCH transmission, the UE 402 may determine the transmit power according to a form similar to the following:

$$P_{PUCCH,b,f,c}(i, q_d, q_u, l) = \min$$
$$\left\{ \begin{array}{l} P_{CMAX,f,c}(i), \\ P_{O\_PUCCH,b,f,c}(q_u) + \log_{10}(2^\mu \cdot M_{RB,b,f,c}^{PUCCH}(i)) + \alpha_{b,f,c}(q_d) \cdot PL_{b,f,c}(q_d) + \\ +\Delta_{F\_PUCCH}(F) + \Delta_{TF,d}(i) + g_{b,f,c}(i, l) + \beta_{b,f,c}(q_d, q_u) + \Delta_{TF,d}(i) \end{array} \right\}.$$

In this example, b may represent a bandwidth part associated with an uplink connection, to the gNB 404, for the first uplink transmission; f may represent a carrier including the bandwidth part; c may represent a serving cell for the UE 402 and including the gNB 404; i may represent an occasion (e.g., in time) in which the UE 402 transmits the first uplink transmission; and l may represent an indicator of a configuration for the PUCCH.

Additionally, $P_{PUSCH,b,f,c}(i,q_d,q_u,l)$ may represent the transmit power for the first uplink transmission, and $P_{CMAX,f,c}(i)$ may represent a maximum output power configured for the UE 402 (e.g., RRC configured from the gNB 404 and/or preconfigured for the UE 402 according to 3GPP specifications and/or another standard). Additionally, $P_{O\_PUSCH,b,f,c}(q_u)$ may represent a target power associated with the first uplink transmission, where $q_u$ may represent a reference signal upon which the target power is based, at least in part. In some aspects, as described above, the first power control parameter may include a reduced target power that the UE 402 uses in lieu of $P_{O\_PUSCH,b,f,c}(q_u)$.

Additionally, $M_{RB,b,f,c}^{PUSCH}(i)$ represent a bandwidth of a resource assignment associated with the first uplink transmission, and ti may represent an SCS configuration associated with the first uplink transmission. Additionally, $PL_{b,f,c}(q_d)$ may represent a pathloss estimate, where $q_d$ may represent a reference signal used to estimate the pathloss. In some aspects, as described above, the first power control parameter may include a scaling factor (e.g., represented by $\alpha_{b,f,c}(q_d)$) that the UE 402 uses to scale the pathloss, thereby reducing $P_{PUSCH,b,f,c}(i,q_d,q_u,l)$.

Additionally, $\Delta_{F\_PUCCH}(F)$ may represent a factor based at least in part on a format (e.g., represented by F) for the first uplink transmission. Additionally, $\Delta_{TF,b,f,c}(i)$ may represent a factor based at least in part on a code rate and/or an MCS associated with the first uplink transmission. For example, $\Delta_{TF,b,f,c}(i)$ may increase $P_{PUSCH,b,f,c}(i,q_d,q_u,l)$ as the code rate and/or the MCS increases. Similarly, in some aspects, the UE 402 may additionally use $\Delta_{TF,d}(i)$ to determine $P_{PUSCH,b,f,c}(i,q_d,q_u,l)$. Similar to $\Delta_{TF,b,f,c}(i)$, $\Delta_{TF,d}(i)$ may represent a factor based at least in part on a code rate and/or an MCS associated with a downlink transmission, where d may represent the downlink transmission that at least partially overlaps, in time and/or in frequency, or at least partially neighbors (e.g., within a threshold amount of time and/or a threshold amount of frequency), the first uplink transmission. Similar to $\Delta_{TF,b,f,c}(i)$, $\Delta_{TF,d}(i)$ may become increasingly negative (and thus reduce $P_{PUCCH,b,f,c}(i,q_d,q_u,l)$) as the code rate and/or the MCS of the downlink transmission increases.

Additionally, $g_{b,f,c}(i,l)$ may represent an adjustment state for the PUCCH configuration (e.g., represented by l). In some aspects, the UE 402 may additionally use $\beta_{b,f,c}(q_d,q_u)$ to determine $P_{PUCCH,b,f,c}(i,q_d,q_u,l)$. $\beta_{b,f,c}(q_d,q_u)$ may represent a factor based at least in part on a self-interference associated with the UE 402. For example, the self-interference may have been measured using a reference signal (e.g., represented by $q_d$) on a downlink connection with the gNB 404 and a reference signal (e.g., represented by $q_u$) on the uplink connection with the gNB 404. Although represented using $q_d$, the reference signal used on the downlink connection to measure the self-interference may include the same reference signal as used, or a different reference signal than used, to estimate the pathloss, as described above. Additionally, or alternatively, although represented using $q_u$, the reference signal used on the uplink connection to measure the self-interference may include the same reference signal as used, or a different reference signal than used, to determine the target power, as described above.

In yet another example, when the first uplink transmission includes an SRS, the UE 402 may determine the transmit power according to a form similar to the following:

$$P_{SRS,b,f,c}(i, q_s, q_d, l) = \min \left\{ \begin{array}{l} P_{CMAX,f,c}(i), \\ P_{O\_SRS,b,f,c}(q_s) + \log_{10}(2^\mu \cdot M_{SRS,b,f,c}(i)) + \alpha_{SRS,b,f,c}(q_s) \cdot PL_{b,f,c}(q_d) + \\ + h_{b,f,c}(i, l) + \beta_{b,f,c}(q_d, q_s) + \Delta_{TF,d}(i) \end{array} \right\}.$$

In this example, b may represent a bandwidth part associated with an uplink connection, to the gNB 404, for the first uplink transmission; f may represent a carrier including the bandwidth part; c may represent a serving cell for the UE 402 and including the gNB 404; i may represent an occasion (e.g., in time) in which the UE 402 transmits the first uplink transmission; and l may represent an indicator of a configuration for the SRS.

Additionally, $P_{SRS,b,f,c}(i,q_s,q_d,l)$ may represent the transmit power for the first uplink transmission, and $P_{CMAX,f,c}(i)$ may represent a maximum output power configured for the UE 402 (e.g., RRC configured from the gNB 404 and/or preconfigured for the UE 402 according to 3GPP specifications and/or another standard). Additionally, $P_{O\_SRS,b,f,c}(q_s)$ may represent a target power associated with the first uplink transmission, where q may represent a resource set for the SRS upon which the target power is based, at least in part. In some aspects, as described above, the first power control parameter may include a reduced target power that the UE 402 uses in lieu of $P_{O\_SRS,b,f,c}(q_s)$.

Additionally, $M_{SRS,b,f,c}(i)$ may represent a bandwidth of a resource assignment associated with the first uplink transmission, and y may represent an SCS configuration associated with the first uplink transmission. Moreover, $\alpha_{SRS,b,f,c}(q_s)$ may represent a scaling factor for a pathloss estimate (e.g., represented by $PL_{b,f,c}(q_d)$), where $q_d$ may represent a reference signal used to estimate the pathloss. In some aspects, as described above, the first power control parameter may include a reduced scaling factor for the pathloss estimate that the UE 402 uses in lieu of $\alpha_{SRS,b,f,c}(q_s)$.

Additionally, $h_{b,f,c}(i,l)$ may represent an adjustment state for the SRS configuration (e.g., represented by l). In some aspects, as described above, the UE 402 may additionally use $\Delta_{TF,d}(i)$ to determine $P_{SRS,b,f,c}(i,q_s,q_d,l)$. $\Delta_{TF,d}(i)$ may represent a factor based at least in part on a code rate and/or an MCS associated with a downlink transmission, where d may represent the downlink transmission that at least partially overlaps, in time and/or in frequency, or at least partially neighbors (e.g., within a threshold amount of time and/or a threshold amount of frequency), the first uplink transmission. $\Delta_{TF,d}(i)$ may become increasingly negative (and thus reduce $P_{SRS,b,f,c}(i,q_s,q_d,l)$) as the code rate and/or the MCS of the downlink transmission increases.

Additionally, in some aspects, the UE 402 may additionally use $\beta_{b,f,c}(q_d,q_s)$ to determine $P_{SRS,b,f,c}(i,q_s,q_s,q_d,l)$. $\beta_{b,f,c}(q_d,q_s)$ may represent a factor based at least in part on a self-interference associated with the UE 402. For example, the self-interference may have been measured using a reference signal (e.g., represented by $q_d$) on a downlink connection with the gNB 404 and a reference signal in the SRS resource set (e.g., represented by $q_s$) on the uplink connection with the gNB 404. Although represented using $q_d$, the reference signal used on the downlink connection to measure the self-interference may include the same reference signal as used, or a different reference signal than used, to estimate the pathloss, as described above. Additionally, or alternatively, although represented using $q_s$, the reference signal used on the uplink connection to measure the self-interference may be included in the same SRS resource set as used, or a different SRS resource set than used, to determine the target power, as described above.

In another example, when the first uplink transmission includes a RACH message, the UE 402 may determine the transmit power according to a form similar to the following:

$$P_{PRACH,b,f,c}(i, q_u, q_d) = \min \left\{ \begin{array}{l} P_{CMAX,f,c}(i), \\ P_{PRACH,target} + \alpha_{PRACH,f,c} \cdot PL_{b,f,c} + \\ + \beta_{f,c}(q_d, q_u) + \Delta_{TF,d}(i) \end{array} \right\}.$$

In this example, b may represent a bandwidth part associated with an uplink connection, to the gNB 404, for the first uplink transmission; f may represent a carrier including the bandwidth part; c may represent a serving cell for the UE 402 and including the gNB 404; and i may represent an occasion (e.g., in time) in which the UE 402 transmits the first uplink transmission.

Additionally, $P_{PRACH,b,f,c}(i,q_u,q_d)$ may represent the transmit power for the first uplink transmission, and $P_{CMAX,f,c}(i)$ may represent a maximum output power configured for the UE 402 (e.g., RRC configured from the gNB 404 and/or preconfigured for the UE 402 according to 3GPP specifications and/or another standard). Additionally, $P_{PRACH,target,f,c}$ may represent a target power associated with the first uplink transmission. In some aspects, as described above, the first power control parameter may include a reduced target power that the UE 402 uses in lieu of $P_{PRACH,target,f,c}$.

Additionally, $PL_{b,f,c}$ may represent a pathloss estimate. In some aspects, as described above, the first power control parameter may include a scaling factor (e.g., represented by $\alpha_{PRACH,f,c}$) that the UE 402 uses to scale the pathloss, thereby reducing $P_{PRACH,b,f,c}(i,q_u,q_d)$.

In some aspects, as described above, the UE 402 may additionally use $\Delta_{TF,d}(i)$ to determine $P_{PRACH,b,f,c}(i,q_w,q_d)$. $\Delta_{TF,d}(i)$ may represent a factor based at least in part on a code rate and/or an MCS associated with a downlink transmission, where d may represent the downlink transmission that at least partially overlaps, in time and/or in frequency, or at least partially neighbors (e.g., within a threshold amount of time and/or a threshold amount of frequency), the first uplink transmission. $\Delta_{TF,d}(i)$ may become increasingly negative (and thus reduce $P_{PRACH,b,f,c}(i,q_u,q_d)$) as the code rate and/or the MCS of the downlink transmission increases.

Additionally, in some aspects, the UE 402 may additionally use $\beta_{b,f,c}(q_d,q_u)$ to determine $P_{PRACH,b,f,c}(i,q_u,q_d)$. $\beta_{b,f,c}(q_d,q_u)$ may represent a factor based at least in part on a self-interference associated with the UE 402. For example, the self-interference may have been measured using a reference signal (e.g., represented by $q_d$) on a downlink connection with the gNB 404 and a reference signal (e.g., represented by $q_u$) on the uplink connection with the gNB 404.

As shown in connection with reference number 615, the UE 402 may transmit, and the base station 404 may receive, the first uplink transmission based at least in part on the first power control parameter. By transmitting the first uplink transmission with a transmit power that is adjusted (e.g., reduced) in accordance with, or otherwise based at least in part on, the first power control parameter (e.g., as described in any or all of the examples above), the UE 402 may reduce self-interference and thus improve the quality and/or reliability of the first uplink transmission. Additionally, on account of the reduced interference, the UE 402 may reduce a possible need to retransmit the first uplink transmission, thereby conserving network and processing resources.

As indicated above, FIG. 6 is provided as an example. Other examples may differ from what is described with respect to FIG. 6.

Figure 7:
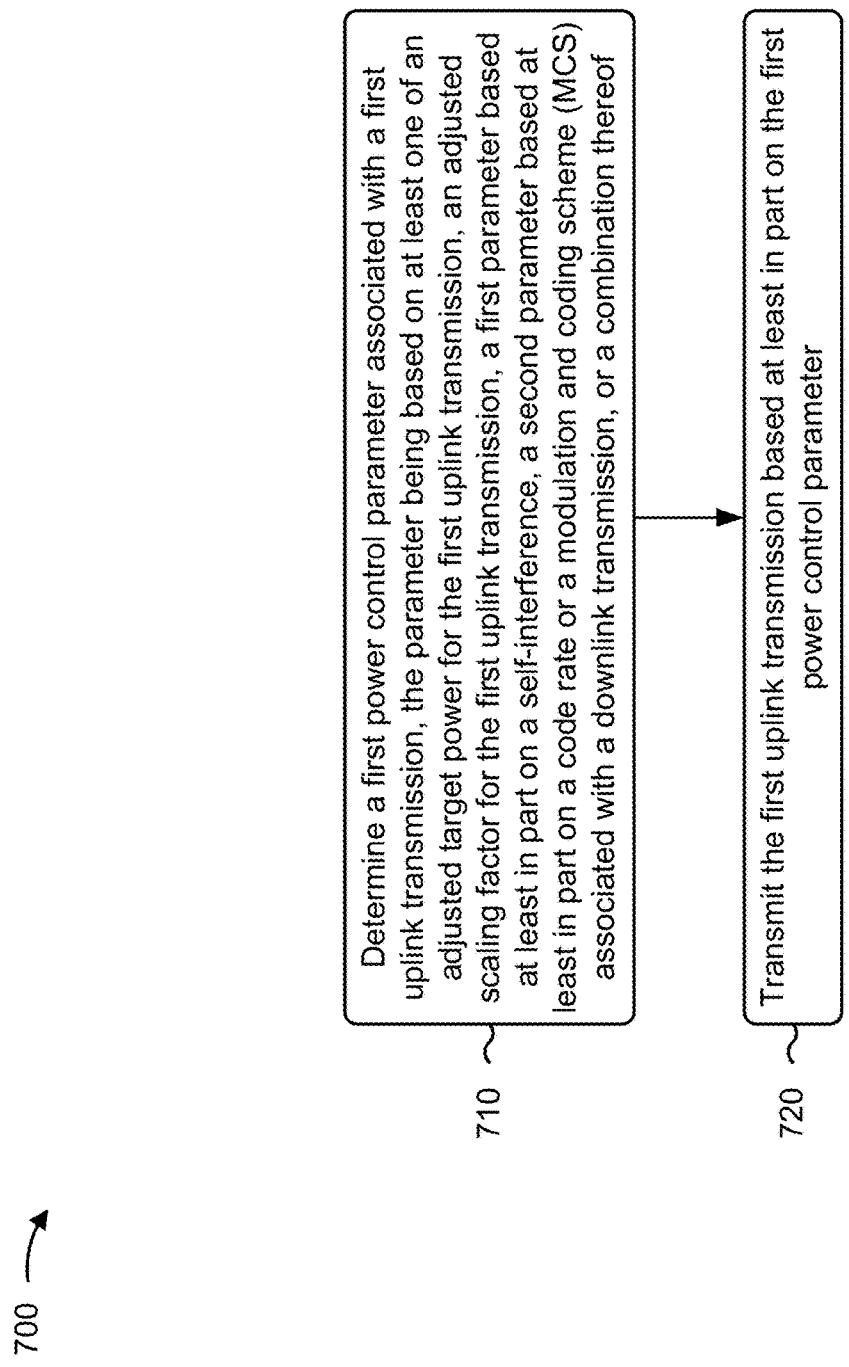
FIG. 7 is a diagram illustrating an example process performed by a UE, in accordance with the present disclosure.

FIG. 7 is a diagram illustrating an example process 700 performed, for example, by a UE, in accordance with the present disclosure. Example process 700 is an example where the UE (e.g., UE 402, UE 120, and/or another network node, such as an MT unit and/or a child IAB node) performs operations associated with controlling power for uplink communications in a full duplex mode.

As shown in FIG. 7, in some aspects, process 700 may include determining a first power control parameter associated with a first uplink transmission from the UE (block 710). For example, the UE (e.g., using one or more of transmit processor 264, TX MIMO processor 266, modulator 254, controller/processor 280, and/or memory 282) may determine the first power control parameter associated with the first uplink transmission from the UE, as described above. In some aspects, the first power control parameter is based on at least one of an adjusted target power for the first uplink transmission, an adjusted scaling factor for the first uplink transmission, a first parameter based at least in part on a self-interference associated with the UE, a second parameter based at least in part on a code rate or an MCS associated with a downlink transmission for the UE, or a combination thereof.

As further shown in FIG. 7, in some aspects, process 700 may include transmitting, to a base station (e.g., gNB 404, base station 110, and/or another network node, such as a CU, a DU, and/or a parent IAB node), the first uplink transmission based at least in part on the first power control parameter (block 720). For example, the UE (e.g., using one or more of antenna 252, transmit processor 264, TX MIMO processor 266, modulator 254, controller/processor 280, and/or memory 282) may transmit, to the base station, the first uplink transmission based at least in part on the first power control parameter, as described above.

Process 700 may include additional aspects, such as any single aspect or any combination of aspects described below and/or in connection with one or more other processes described elsewhere herein.

In a first aspect, the first power control parameter is determined based at least in part on a setting stored in a memory of the UE.

In a second aspect, alone or in combination with the first aspect, the first power control parameter is determined based at least in part on receiving (e.g., using one or more of antenna 252, demodulator 254, MIMO detector 256, receive processor 258, transmit processor 264, controller/processor 280, and/or memory 282) a message from the base station.

In a third aspect, alone or in combination with one or more of the first and second aspects, the first uplink transmission is associated with a first channel, and the first channel includes at least one of a PUSCH, a PUCCH, an SRS, a RACH, or a combination thereof.

In a fourth aspect, alone or in combination with one or more of the first through third aspects, the first power control parameter associated with the first uplink transmission is determined independently of determining a second power control parameter associated with a second uplink transmission, the second uplink transmission is associated with a second channel that is different from the first channel, and the second channel includes at least one of a PUSCH, a PUCCH, an SRS, a RACH, or a combination thereof.

In a fifth aspect, alone or in combination with one or more of the first through fourth aspects, the first uplink transmission is associated with a full duplex mode for the UE.

In a sixth aspect, alone or in combination with one or more of the first through fifth aspects, the UE, when in the full duplex mode, transmits and receives, in a same frequency bandwidth, concurrently.

In a seventh aspect, alone or in combination with one or more of the first through sixth aspects, the UE, when in the full duplex mode, transmits a first set of symbols and receives a second set of symbols, in a same frequency bandwidth, where the first set of symbols and the second set of symbols are separated in time by less than a threshold.

In an eighth aspect, alone or in combination with one or more of the first through seventh aspects, the UE, when in the full duplex mode, transmits a first set of symbols in a first frequency bandwidth and, concurrently, receives a second set of symbols in a second frequency bandwidth, where the first frequency bandwidth and the second frequency bandwidth are separated in frequency by less than a threshold.

In a ninth aspect, alone or in combination with one or more of the first through eighth aspects, the first power control parameter associated with the first uplink transmission is determined independently of determining a second power control parameter associated with a second uplink transmission, and the second uplink transmission is associated with a half duplex mode for the UE.

In a tenth aspect, alone or in combination with one or more of the first through ninth aspects, the first uplink transmission is associated with a first resource indicator.

In an eleventh aspect, alone or in combination with one or more of the first through tenth aspects, the first power control parameter associated with the first uplink transmission is determined independently of determining a second power control parameter associated with a second uplink transmission, and the second uplink transmission is associated with a second resource indicator that is different from the first resource indicator.

In a twelfth aspect, alone or in combination with one or more of the first through eleventh aspects, the first uplink transmission is associated with a URLLC mode.

In a thirteenth aspect, alone or in combination with one or more of the first through twelfth aspects, the first power control parameter associated with the first uplink transmission is determined independently of determining a second power control parameter associated with a second uplink transmission, and the second uplink transmission is not associated with the URLLC mode.

In a fourteenth aspect, alone or in combination with one or more of the first through thirteenth aspects, the first uplink transmission includes at least one first symbol associated with a full duplex mode for the UE and at least one second symbol associated with a half duplex mode for the UE.

In a fifteenth aspect, alone or in combination with one or more of the first through fourteenth aspects, the first uplink transmission is transmitted using the first power control parameter for the at least one first symbol and using the first power control parameter for the at least one second symbol.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
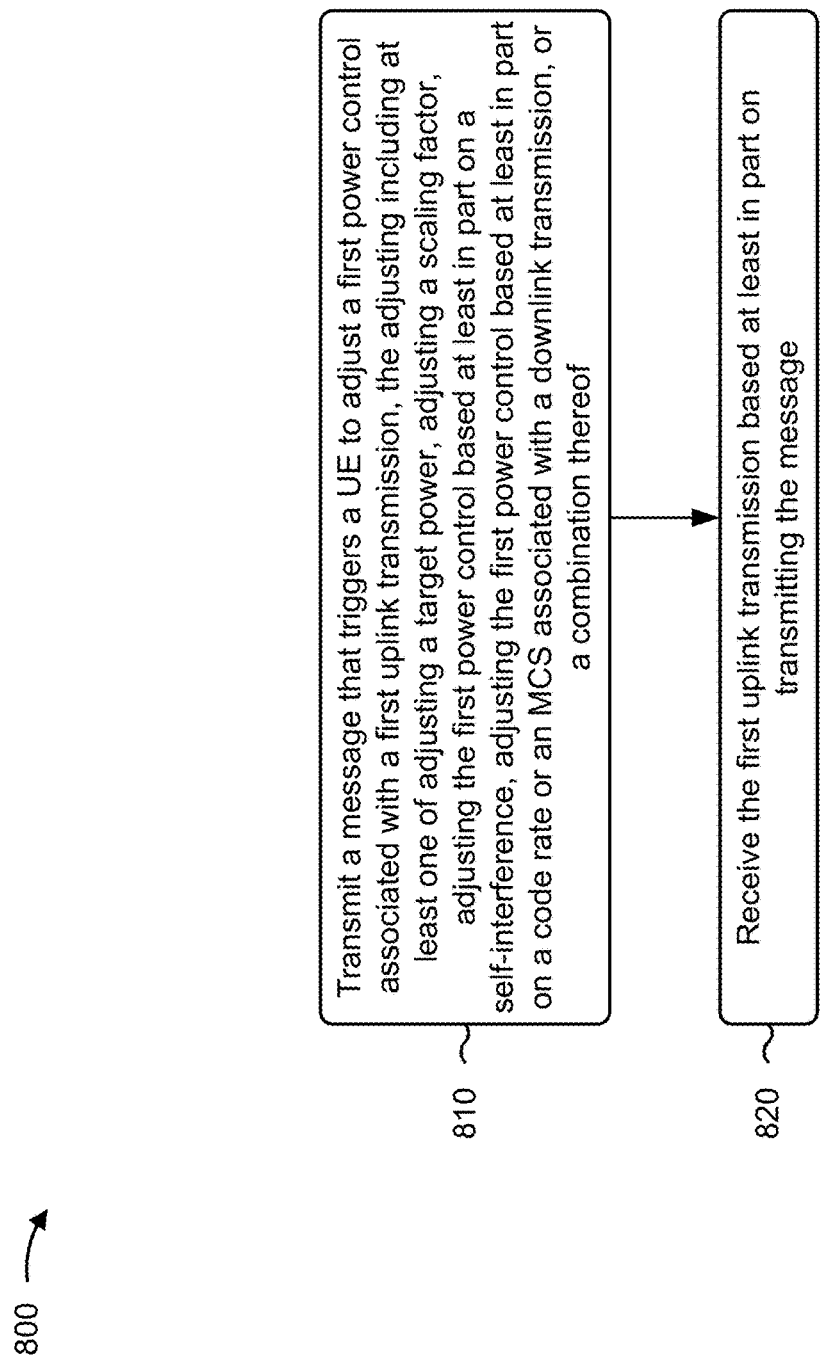
FIG. 8 is a diagram illustrating an example process performed by a base station, in accordance with the present disclosure.

FIG. 8 is a diagram illustrating an example process 800 performed, for example, by a base station, in accordance with the present disclosure. Example process 800 is an example where the base station (e.g., gNB 404, base station 110, and/or another network node, such as a CU, a DU, and/or a parent IAB node) performs operations associated with controlling power for uplink communications in a full duplex mode.

As shown in FIG. 8, in some aspects, process 800 may include transmitting, to a UE (e.g., UE 402, UE 120, and/or another network node, such as an MT unit and/or a child IAB node), a message that triggers the UE to adjust a first power control associated with a first uplink transmission from the UE (block 810). For example, the base station (e.g., using one or more of transmit processor 220, TX MIMO processor 230, modulator 232, antenna 234, controller/ processor 240, memory 242, and/or scheduler 246) may transmit, to the UE, the message that triggers the UE to adjust the first power control associated with the first uplink transmission from the UE, as described above. In some aspects, adjusting the first power control includes at least one of: adjusting a target power, adjusting a scaling factor, adjusting the first power control based at least in part on a self-interference associated with the UE, adjusting the first power control based at least in part on a code rate or an MCS associated with a downlink transmission for the UE, or a combination thereof.

As further shown in FIG. 8, in some aspects, process 800 may include receiving, from the UE, the first uplink transmission based at least in part on transmitting the message (block 820). For example, the base station (e.g., using one or more of antenna 234, demodulator 232, MIMO detector 236, receive processor 238, controller/processor 240, memory 242, or scheduler 246) may receive, from the UE, the first uplink transmission based at least in part on transmitting the message, as described above.

Process 800 may include additional aspects, such as any single aspect or any combination of aspects described below and/or in connection with one or more other processes described elsewhere herein.

In a first aspect, the first uplink transmission is associated with a first channel, and the first channel includes at least one of a PUSCH, a PUCCH, an SRS, a RACH, or a combination thereof.

In a second aspect, alone or in combination with the first aspect, the message triggers the UE to adjust the first power control associated with the first uplink transmission independently of a second power control associated with a second uplink transmission, the second uplink transmission is associated with a second channel that is different from the first channel, and the second channel includes at least one of a PUSCH, a PUCCH, an SRS, a RACH, or a combination thereof.

In a third aspect, alone or in combination with one or more of the first and second aspects, the first uplink transmission is associated with a full duplex mode for the UE.

In a fourth aspect, alone or in combination with one or more of the first through third aspects, the UE, when in the full duplex mode, transmits and receives, in a same frequency bandwidth, concurrently.

In a fifth aspect, alone or in combination with one or more of the first through fourth aspects, the UE, when in the full duplex mode, transmits a first set of symbols and receives a second set of symbols, in a same frequency bandwidth, where the first set of symbols and the second set of symbols are separated in time by less than a threshold.

In a sixth aspect, alone or in combination with one or more of the first through fifth aspects, the UE, when in the full duplex mode, transmits a first set of symbols in a first frequency bandwidth and, concurrently, receives a second set of symbols in a second frequency bandwidth, where the first frequency bandwidth and the second frequency bandwidth are separated in frequency by less than a threshold.

In a seventh aspect, alone or in combination with one or more of the first through sixth aspects, the message triggers the UE to adjust the first power control associated with the first uplink transmission independently of a second power control associated with a second uplink transmission, and the second uplink transmission is associated with a half duplex mode for the UE.

In an eighth aspect, alone or in combination with one or more of the first through seventh aspects, the first uplink transmission is associated with a first resource indicator.

In a ninth aspect, alone or in combination with one or more of the first through eighth aspects, the message triggers the UE to adjust the first power control associated with the first uplink transmission independently of a second power control associated with a second uplink transmission, and the second uplink transmission is associated with a second resource indicator that is different from the first resource indicator.

In a tenth aspect, alone or in combination with one or more of the first through ninth aspects, the first uplink transmission is associated with a URLLC mode.

In an eleventh aspect, alone or in combination with one or more of the first through tenth aspects, the message triggers the UE to adjust the first power control associated with the first uplink transmission independently of a second power control associated with a second uplink transmission, and the second uplink transmission is not associated with the URLLC mode.

In a twelfth aspect, alone or in combination with one or more of the first through eleventh aspects, the first uplink transmission includes at least one first symbol associated with a full duplex mode for the UE and at least one second symbol associated with a half duplex mode for the UE.

In a thirteenth aspect, alone or in combination with one or more of the first through twelfth aspects, the first uplink transmission is received based at least in part on the first power control for the at least one first symbol and based at least in part on the first power control for the at least one second symbol.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: determining a first power control parameter associated with a first uplink transmission from the UE, wherein the first power control parameter is based on at least one of: an adjusted target power for the first uplink transmission, an adjusted scaling factor for the first uplink transmission, a first parameter based at least in part on a self-interference associated with the UE, a second parameter based at least in part on a code rate or a modulation and coding scheme (MCS) associated with a downlink transmission for the UE, or a combination thereof; and transmitting, to a base station, the first uplink transmission based at least in part on the first power control parameter.

Aspect 2: The method of Aspect 1, wherein the first power control parameter is determined based at least in part on a setting stored in a memory of the UE.

Aspect 3: The method of any of Aspects 1 through 2, wherein the UE determines the first power control parameter based at least in part on receiving a message from the base station.

Aspect 4: The method of any of Aspects 1 through 3, wherein the first uplink transmission is associated with a first channel, wherein the first channel includes at least one of a physical uplink shared channel (PUSCH), a physical uplink control channel (PUCCH), a sounding reference signal (SRS), a random access channel (RACH), or a combination thereof.

Aspect 5: The method of Aspect 4, wherein the first power control parameter associated with the first uplink transmission is determined independently of determining a second power control parameter associated with a second uplink transmission, wherein the second uplink transmission is associated with a second channel that is different from the first channel, and wherein the second channel includes at least one of a PUSCH, a PUCCH, an SRS, a RACH, or a combination thereof.

Aspect 6: The method of any of Aspects 1 through 5, wherein the first uplink transmission is associated with a full duplex mode for the UE.

Aspect 7: The method of Aspect 6, wherein the UE, when in the full duplex mode, transmits and receives, in a same frequency bandwidth, concurrently.

Aspect 8: The method of Aspect 6, wherein the UE, when in the full duplex mode, transmits a first set of symbols and receives a second set of symbols, in a same frequency bandwidth, wherein the first set of symbols and the second set of symbols are separated in time by less than a threshold.

Aspect 9: The method of Aspect 6, wherein the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 10: The method of any of Aspects 6 through 9, wherein the first power control parameter associated with the first uplink transmission is determined independently of determining a second power control parameter associated with a second uplink transmission, wherein the second uplink transmission is associated with a half duplex mode for the UE.

Aspect 11: The method of any of Aspects 1 through 10, wherein the first uplink transmission is associated with a first resource indicator.

Aspect 12: The method of Aspect 11, wherein the first power control parameter associated with the first uplink transmission is determined independently of determining a second power control parameter associated with a second uplink transmission, wherein the second uplink transmission is associated with a second resource indicator that is different from the first resource indicator.

Aspect 13: The method of any of Aspects 1 through 12, wherein the first uplink transmission is associated with an ultra-reliable low-latency communication (URLLC) mode.

Aspect 14: The method of Aspect 13, wherein the first power control parameter associated with the first uplink transmission is determined independently of determining a second power control parameter associated with a second uplink transmission, wherein the second uplink transmission is not associated with the URLLC mode.

Aspect 15: The method of any of Aspects 1 through 14, wherein the first uplink transmission includes at least one first symbol associated with a full duplex mode for the UE and at least one second symbol associated with a half duplex mode for the UE.

Aspect 16: The method of Aspect 15, wherein the first uplink transmission is transmitted using the first power control parameter for the at least one first symbol and using the first power control parameter for the at least one second symbol.

Aspect 17: A method of wireless communication performed by a base station, comprising: transmitting, to a user equipment (UE), a message that triggers the UE to adjust a first power control associated with a first uplink transmission from the UE, wherein adjusting the first power control includes at least one of: adjusting a target power, adjusting a scaling factor, adjusting the first power control based at least in part on a self-interference associated with the UE, adjusting the first power control based at least in part on a code rate or a modulation and coding scheme (MCS) associated with a downlink transmission for the UE, or a combination thereof; and receiving, from the UE, the first uplink transmission based at least in part on transmitting the message.

Aspect 18: The method of Aspect 17, wherein the first uplink transmission is associated with a first channel, wherein the first channel includes at least one of a physical uplink shared channel (PUSCH), a physical uplink control channel (PUCCH), a sounding reference signal (SRS), a random access channel (RACH), or a combination thereof.

Aspect 19: The method of Aspect 18, wherein the message triggers the UE to adjust the first power control associated with the first uplink transmission independently of a second power control associated with a second uplink transmission, wherein the second uplink transmission is associated with a second channel that is different from the first channel, and wherein the second channel includes at least one of a PUSCH, a PUCCH, an SRS, a RACH, or a combination thereof.

Aspect 20: The method of any of Aspects 17 through 19, wherein the first uplink transmission is associated with a full duplex mode for the UE.

Aspect 21: The method of Aspect 20, wherein the UE, when in the full duplex mode, transmits and receives, in a same frequency bandwidth, concurrently.

Aspect 22: The method of Aspect 20, wherein the UE, when in the full duplex mode, transmits a first set of symbols and receives a second set of symbols, in a same frequency bandwidth, wherein the first set of symbols and the second set of symbols are separated in time by less than a threshold.

Aspect 23: The method of Aspect 20, wherein the UE, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 24: The method of any of Aspects 20 through 23, wherein the message triggers the UE to adjust the first power control associated with the first uplink transmission independently of a second power control associated with a second uplink transmission, wherein the second uplink transmission is associated with a half duplex mode for the UE.

Aspect 25: The method of any of Aspects 17 through 24, wherein the first uplink transmission is associated with a first resource indicator.

Aspect 26: The method of Aspect 25, wherein the message triggers the UE to adjust the first power control associated with the first uplink transmission independently of a second power control associated with a second uplink transmission, wherein the second uplink transmission is associated with a second resource indicator that is different from the first resource indicator.

Aspect 27: The method of any of Aspects 17 through 26, wherein the first uplink transmission is associated with an ultra-reliable low-latency communication (URLLC) mode.

Aspect 28: The method of Aspect 27, wherein the message triggers the UE to adjust the first power control associated with the first uplink transmission independently of a second power control associated with a second uplink transmission, wherein the second uplink transmission is not associated with the URLLC mode.

Aspect 29: The method of any of Aspects 17 through 28, wherein the first uplink transmission includes at least one first symbol associated with a full duplex mode for the UE and at least one second symbol associated with a half duplex mode for the UE.

Aspect 30: The method of Aspect 29, wherein the first uplink transmission is received based at least in part on the first power control for the at least one first symbol and based at least in part on the first power control for the at least one second symbol.

Aspect 31: An apparatus for wireless communication at a device, comprising a processor; memory coupled with the processor; and instructions stored in the memory and executable by the processor to cause the apparatus to perform the method of one or more Aspects of Aspects 1-16.

Aspect 32: A device for wireless communication, comprising a memory and one or more processors coupled to the memory, the memory and the one or more processors configured to perform the method of one or more Aspects of Aspects 1-16.

Aspect 33: An apparatus for wireless communication, comprising at least one means for performing the method of one or more Aspects of Aspects 1-16.

Aspect 34: A non-transitory computer-readable medium storing code for wireless communication, the code comprising instructions executable by a processor to perform the method of one or more Aspects of Aspects 1-16.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 36: An apparatus for wireless communication at a device, comprising a processor; memory coupled with the processor; and instructions stored in the memory and executable by the processor to cause the apparatus to perform the method of one or more Aspects of Aspects 17-30.

Aspect 37: A device for wireless communication, comprising a memory and one or more processors coupled to the memory, the memory and the one or more processors configured to perform the method of one or more Aspects of Aspects 17-30.

Aspect 38: An apparatus for wireless communication, comprising at least one means for performing the method of one or more Aspects of Aspects 17-30.

Aspect 39: A non-transitory computer-readable medium storing code for wireless communication, the code comprising instructions executable by a processor to perform the method of one or more Aspects of Aspects 17-30.

Aspect 40: A non-transitory computer-readable medium storing a set of instructions for wireless communication, the set of instructions comprising one or more instructions that, when executed by one or more processors of a device, cause the device to perform the method of one or more Aspects of Aspects 17-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory; and
one or more processors coupled to the memory, wherein the one or more processors are configured to cause the apparatus to:
determine a first power control parameter associated with a first uplink transmission from the apparatus, wherein;
the first power control parameter is based on a full duplex mode for the apparatus and at least one of:
an adjusted target power for the first uplink transmission,
an adjusted scaling factor for the first uplink transmission,
a first parameter based at least in part on a self-interference associated with the apparatus, or
a second parameter based at least in part on a code rate or a modulation and coding scheme (MCS) associated with a downlink transmission for the apparatus; and
the apparatus, when in the full duplex mode, is configured to:
transmit a first set of symbols and receive a second set of symbols, in a same frequency bandwidth, wherein the first set of symbols and the second set of symbols are separated in time by less than a threshold; or
transmit a first set of symbols in a first frequency bandwidth and, concurrently, receive a second set of symbols in a second frequency bandwidth, wherein the first frequency bandwidth and the second frequency bandwidth are separated in frequency by less than a threshold; and
transmit, to a base station, the first uplink transmission based at least in part on the first power control parameter.

2. The apparatus of claim 1, wherein the first power control parameter is determined based at least in part on a setting stored in the memory.

3. The apparatus of claim 1, wherein the first power control parameter is determined based at least in part on receipt of a message from the base station.

4. The apparatus of claim 1, wherein the first uplink transmission is associated with a first channel, wherein the first channel includes at least one of a physical uplink shared channel (PUSCH), a physical uplink control channel (PUCCH), a sounding reference signal (SRS), or a random access channel (RACH).

5. The apparatus of claim 4, wherein determination of the first power control parameter associated with the first uplink transmission is independent of determination of a second power control parameter associated with a second uplink transmission, wherein the second uplink transmission is associated with a second channel that is different from the first channel, and wherein the second channel includes at least one of a PUSCH, a PUCCH, an SRS, or a RACH.

6. The apparatus of claim 1, wherein determination of the first power control parameter associated with the first uplink transmission is independent of determination of a second power control parameter associated with a second uplink transmission, wherein the second uplink transmission is associated with a half duplex mode for the apparatus.

7. The apparatus of claim 1, wherein the first uplink transmission is associated with a first resource indicator.

8. The apparatus of claim 7, wherein determination of the first power control parameter associated with the first uplink transmission is independent of determination of a second power control parameter associated with a second uplink transmission, wherein the second uplink transmission is associated with a second resource indicator that is different from the first resource indicator.

9. The apparatus of claim 1, wherein the first uplink transmission is associated with an ultra-reliable low-latency communication (URLLC) mode.

10. The apparatus of claim 9, wherein determination of the first power control parameter associated with the first uplink transmission is independent of determination of a second power control parameter associated with a second uplink transmission, wherein the second uplink transmission is not associated with the URLLC mode.

11. The apparatus of claim 1, wherein the first uplink transmission includes at least one first symbol associated with the full duplex mode for the apparatus and at least one second symbol associated with a half duplex mode for the apparatus.

12. The apparatus of claim 11, wherein the first uplink transmission is transmitted using the first power control parameter for the at least one first symbol and using the first power control parameter for the at least one second symbol.

13. An apparatus for wireless communication, comprising:
 a memory; and
 one or more processors coupled to the memory, wherein the one or more processors are configured to cause the apparatus to:
  transmit, to a user equipment (UE), a message that triggers the UE to adjust a first power control associated with a first uplink transmission from the UE, wherein;
  adjusting the first power control is based on a full duplex mode for the UE and includes at least one of:
   adjusting a target power,
   adjusting a scaling factor,
   adjusting the first power control based at least in part on a self-interference associated with the UE,
   adjusting the first power control based at least in part on a code rate or a modulation and coding scheme (MCS) associated with a downlink transmission for the UE; and
  the UE, when in the full duplex mode, is configured to:
   transmit a first set of symbols and receive a second set of symbols, in a same frequency bandwidth, wherein the first set of symbols and the second set of symbols are separated in time by less than a threshold; or
   transmit a first set of symbols in a first frequency bandwidth and, concurrently, receive a second set of symbols in a second frequency bandwidth, wherein the first frequency bandwidth and the second frequency bandwidth are separated in frequency by less than a threshold; and
  receive, from the UE, the first uplink transmission based at least in part on transmitting the message.

14. The apparatus of claim 13, wherein the first uplink transmission is associated with a first channel, wherein the first channel includes at least one of a physical uplink shared channel (SRS), a physical uplink control channel (SRS), a sounding reference signal (SRS), or a random access channel (RACH).

15. The apparatus of claim 14, wherein the message triggers the UE to adjust the first power control associated with the first uplink transmission independently of a second power control associated with a second uplink transmission, wherein the second uplink transmission is associated with a second channel that is different from the first channel, and wherein the second channel includes at least one of a SRS, a SRS, an SRS, or a RACH.

16. The apparatus of claim 13, wherein the message triggers the UE to adjust the first power control associated with the first uplink transmission independently of a second power control associated with a second uplink transmission, wherein the second uplink transmission is associated with a half duplex mode for the UE.

17. The apparatus of claim 13, wherein the first uplink transmission is associated with a first resource indicator.

18. The apparatus of claim 17, wherein the message triggers the UE to adjust the first power control associated with the first uplink transmission independently of a second power control associated with a second uplink transmission, wherein the second uplink transmission is associated with a second resource indicator that is different from the first resource indicator.

19. The apparatus of claim 13, wherein the first uplink transmission is associated with an ultra-reliable low-latency communication (URLLC) mode.

20. The apparatus of claim 19, wherein the message triggers the UE to adjust the first power control associated with the first uplink transmission independently of a second power control associated with a second uplink transmission, wherein the second uplink transmission is not associated with the URLLC mode.

21. The apparatus of claim 13, wherein the first uplink transmission includes at least one first symbol associated with the full duplex mode for the UE and at least one second symbol associated with a half duplex mode for the UE.

22. The apparatus of claim 21, wherein the first uplink transmission is received based at least in part on the first power control for the at least one first symbol and based at least in part on the first power control for the at least one second symbol.

23. A method of wireless communication performed by an apparatus, comprising:
 determining a first power control parameter associated with a first uplink transmission from the apparatus, wherein;
  the first power control parameter is based on a full duplex mode for the apparatus and at least one of:
   an adjusted target power for the first uplink transmission,
   an adjusted scaling factor for the first uplink transmission,
   a first parameter based at least in part on a self-interference associated with the apparatus, or
   a second parameter based at least in part on a code rate or a modulation and coding scheme (MCS) associated with a downlink transmission for the apparatus; and
  the apparatus, when in the full duplex mode, is configured to:
   transmit a first set of symbols and receive a second set of symbols, in a same frequency bandwidth, wherein the first set of symbols and the second set of symbols are separated in time by less than a threshold; or
   transmit a first set of symbols in a first frequency bandwidth and, concurrently, receive a second set of symbols in a second frequency bandwidth,
  wherein the first frequency bandwidth and the second frequency bandwidth are separated in frequency by less than a threshold; and
 transmitting, to a base station, the first uplink transmission based at least in part on the first power control parameter.

24. The method of claim 23, wherein:
the first uplink transmission is associated with a first channel;
the first channel includes at least one of a physical uplink shared channel (PUSCH), a physical uplink control channel (PUCCH), a sounding reference signal (SRS), or a random access channel (RACH),
the first power control parameter associated with the first uplink transmission is determined independently of determining a second power control parameter associated with a second uplink transmission;
the second uplink transmission is associated with a second channel that is different from the first channel; and
the second channel includes at least one of a PUSCH, a PUCCH, an SRS, or a RACH.

25. A method of wireless communication performed by an apparatus, comprising:
transmitting, to a user equipment (UE), a message that configures the UE to adjust a first power control associated with a first uplink transmission from the UE, wherein:
adjusting the first power control is based on a full duplex mode for the UE and includes at least one of:
adjusting a target power,
adjusting a scaling factor,
adjusting the first power control based at least in part on a self-interference associated with the UE,
adjusting the first power control based at least in part on a code rate or a modulation and coding scheme (MCS) associated with a downlink transmission for the UE; and
the UE, when in the full duplex mode, is configured to:
transmit a first set of symbols and receive a second set of symbols, in a same frequency bandwidth, wherein the first set of symbols and the second set of symbols are separated in time by less than a threshold; or
transmit a first set of symbols in a first frequency bandwidth and, concurrently, receive a second set of symbols in a second frequency bandwidth, wherein the first frequency bandwidth and the second frequency bandwidth are separated in frequency by less than a threshold; and
receiving, from the UE, the first uplink transmission based at least in part on transmitting the message.

26. The method of claim 23, wherein the first power control parameter is determined based at least in part on a setting stored in a memory of the apparatus.

27. The method of claim 23, wherein the first power control parameter is determined based at least in part on receipt of a message from the base station.

28. The method of claim 23, wherein the first power control parameter associated with the first uplink transmission is determined independently of determining a second power control parameter associated with a second uplink transmission, wherein the second uplink transmission is associated with a half duplex mode for the apparatus.

29. The method of claim 23, wherein the first uplink transmission is associated with a first resource indicator.

30. The method of claim 23, wherein the first uplink transmission is associated with an ultra-reliable low-latency communication (URLLC) mode.

* * * * *